(12) United States Patent
Shimizu

(10) Patent No.: US 7,289,129 B2
(45) Date of Patent: Oct. 30, 2007

(54) SPECIAL EFFECT DEVICE, ADDRESS SIGNAL GENERATING DEVICE, ADDRESS SIGNAL GENERATING METHOD AND ADDRESS SIGNAL GENERATING PROGRAM

(75) Inventor: Hideyuki Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 244 days.

(21) Appl. No.: 10/817,663

(22) Filed: Apr. 2, 2004

(65) Prior Publication Data
US 2004/0196300 A1    Oct. 7, 2004

(30) Foreign Application Priority Data
Apr. 4, 2003    (JP) .......................... P2003-102350

(51) Int. Cl.
*C09G 5/00*    (2006.01)
(52) U.S. Cl. ...................... 345/619; 345/581; 345/649; 345/656; 345/659
(58) Field of Classification Search ...................... None
See application file for complete search history.

(56) References Cited

U.S. PATENT DOCUMENTS 4,860,217 A * 8/1989 Sasaki et al. ................ 345/653
5,521,648 A * 5/1996 Shiraishi et al. ............ 348/580

OTHER PUBLICATIONS

Title: Perspective Filters in FCP, Author: Ken Stone, date: Nov. 2001, pp. 1-6 http://www.lafcpug.org/tutorials/basic_perspective_print.html.* http://photos.travisswicegood.com/v/Objects-and-Toys/StopSign BulletHole.jpg.html.*
http://www.amazon.com/gp/product/B0002NIIQ8/qid=11414046 58/sr=1-13/ref=sr_1_13/104-4045014-4227167?%5Fencoding= UTF8&v=glance&n=15684181.*
http://www.dreamstime.com/bazooka-holeinasteelwall-image4586 12.*

* cited by examiner

*Primary Examiner*—Mark Zimmerman
*Assistant Examiner*—Jwalant Amin
(74) *Attorney, Agent, or Firm*—Frommer Lawrence & Haug LLP; William S. Frommer; Thomas F. Presson

(57) ABSTRACT

A special effect device by which an entirely new special picture effect is to be implemented in accordance with a read address control system. The device includes an address signal generating unit 3 which generates a readout address signal for picture signals stored in a frame buffer 2, so that, by flipping a picture, ruptured with an optional position of a picture, corresponding to the picture signals stored in the frame buffer 2, as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point along a plane parallel to the first virtual plane, such a special effect will be obtained in which the picture on the first virtual plane is peeled off sequentially radially along the arc, about the optional position as center, so as to disappear to outside a display area.

8 Claims, 13 Drawing Sheets

| PARAMETER NAME | MEANING | RANGE | DEFAULT |
|---|---|---|---|
| fixRadius | RADIUS | 0.0to1.0 | 0.2 |
| fixCenterX | CENTER | -1.0to1.0 | 0.0 |
| fixCenterY | CENTER | -1.0to1.0 | 0.0 |
| trans | AMOUNT OF MOVEMENT | 0.0to1.0 | |
| fixLightAngle | ANGLE OF LIGHT SOURCE | 30.0to80.0 | 50.0 |
| fixDiffuseLightRatio | INTENSITY OF LIGHT SOURCE | 0.0to1.0 | 0.5 |
| fixReverseHighlight | HIGHLIGHT QUANTITY OF BACK SURFACE | 0.0to200.0 | 70.0 |
| fixReverseSmoothness | DIFFUSION OF REFLECTION OF BACK SURFACE | 0.0to20.0 | 15.0 |
| fixMatteRatio | TRANSMITTANCE | 0.0to1.0 | 0.0 |
| vMatteColor | COLOR OF BACK SURFACE | R/G/B0to255 | all128 |
| vLightColor | COLOR OF LIGHT SOURCE | R/G/B0to255 | all235 |

FIG.5

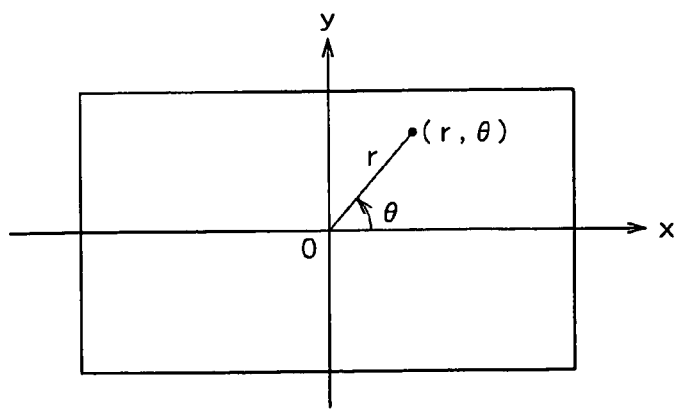

FIG.6

| PARAMETER NAME | MEANING | RANGE | DEFAULT |
|---|---|---|---|
| fixRadius | RADIUS | 0.0to1.0 | 0.2 |
| fixCenterX | CENTER | -1.0to1.0 | 0.0 |
| fixCenterY | CENTER | -1.0to1.0 | 0.0 |
| trans | AMOUNT OF MOVEMENT | 0.0to1.0 | |
| fixLightAngle | ANGLE OF LIGHT SOURCE | 30.0to80.0 | 50.0 |
| fixDiffuseLightRatio | INTENSITY OF LIGHT SOURCE | 0.0to1.0 | 0.5 |
| fixReverseHighlight | HIGHLIGHT QUANTITY OF BACK SURFACE | 0.0to200.0 | 70.0 |
| fixReverseSmoothness | DIFFUSION OF REFLECTION OF BACK SURFACE | 0.0to20.0 | 15.0 |
| fixMatteRatio | TRANSMITTANCE | 0.0to1.0 | 0.0 |
| vMatteColor | COLOR OF BACK SURFACE | R/G/B0to255 | all128 |
| vLightColor | COLOR OF LIGHT SOURCE | R/G/B0to255 | all235 |

FIG.18

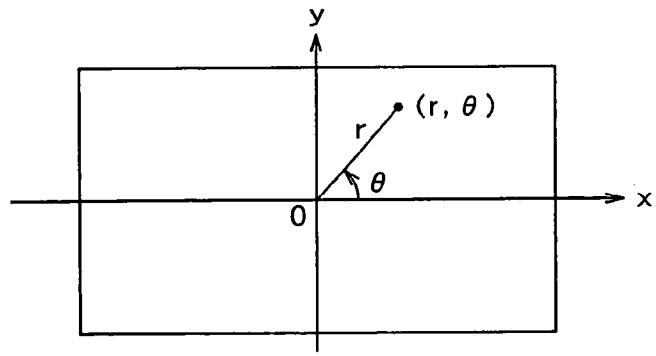

FIG.19

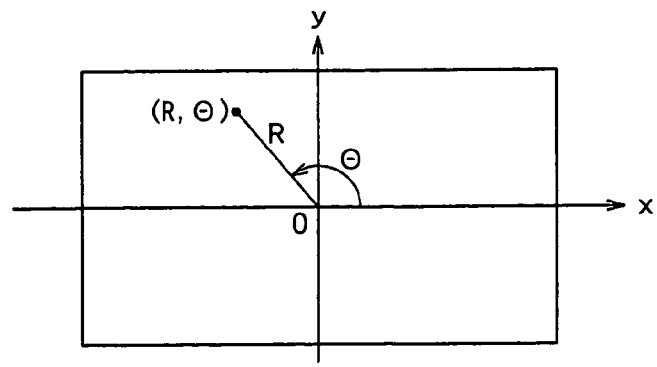

FIG.20

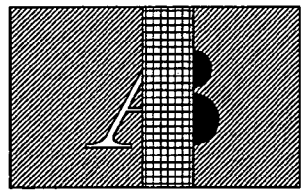
FIG. 25
| PARAMETER NAME | MEANING | RANGE | DEFAULT |
|---|---|---|---|
| lDivide | NUMBER OF TIMES OF FOLDING | 2to10 | 4 |
| fixRotate | AMOUNT OF ROTATION | -720.0to720.0 | 0.0 |
| fixMatteRatio | TRANSMITTANCE | 0.0to1.0 | 0.0 |
| vMatteColor[4] | COLOR OF BACK SURFACE | R/G/B0to255 | all192 |
| trans | AMOUNT OF MOVEMENT | 0.0to1.0 | |
FIG. 26
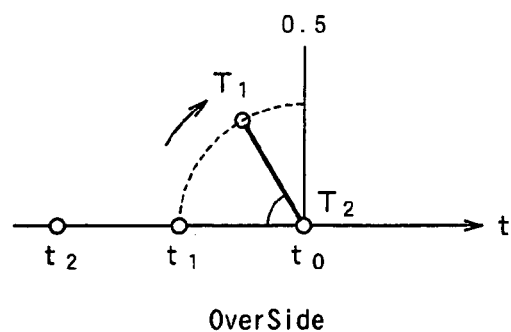
OverSide
FIG. 27

SPECIAL EFFECT DEVICE, ADDRESS SIGNAL GENERATING DEVICE, ADDRESS SIGNAL GENERATING METHOD AND ADDRESS SIGNAL GENERATING PROGRAM

BACKGROUND OF THE INVENTION

1. Field of the Invention

This invention relates to a special picture effect and, more particularly, to a special effect device for executing the special picture effect using a read address control system. This invention also relates to an address signal generating device, an address signal generating method and an address signal generating program.

This application claims priority of Japanese Patent Application No. 2003-102350 filed in Japan on Apr. 4, 2003, the entirety of which is incorporated by reference herein.

2. Description of Related Art

A read address control system, in which a special picture effect is applied to picture signals stored in a frame memory by converting the readout address (address at the time of readout) and reading out the resulting address to apply a special picture effect to the picture signals, has been devised and put to practical use (see for example the Japanese Laying-Open Patent Publication H10-145672).

This read address control system has been devised and put to practical use only with respect to an extremely simple special picture effect, such as enlargement, contraction, rotation or displacement of pictures.

SUMMARY OF THE INVENTION

It is therefore an object of the present invention to provide a special effect device, an address signal generating device, an address signal generating method and an address signal generating program, which execute an entirely new special picture effect with the use of the aforementioned read address system.

In one aspect, the present invention provides a special effect device in which picture signals are read out from a frame buffer based on an address signal to impart a desired special effect to the picture signals read out from the frame buffer, in which the special effect device comprises address signal generating means for generating a readout address signal for the picture signals stored in the frame buffer so that, by flipping a picture, ruptured with an optional position of a picture, corresponding to the picture signals stored in the frame buffer, as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point along a plane parallel to the first virtual plane, such a special effect will be obtained in which the picture on the first virtual plane is peeled off sequentially radially along the arc about the optional position as center so as to disappear to outside a display area.

In another aspect, the present invention provides an address signal generating device for generating an address signal for reading out picture signals from a frame buffer, in which the address signal generating device comprises address signal generating means for generating a readout address signal for the picture signals stored in the frame buffer so that, by flipping a picture, ruptured with an optional position of a picture, corresponding to the picture signals stored in the frame buffer, as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point along a plane parallel to the first virtual plane, such a special effect will be obtained in which the picture on the first virtual plane is peeled off sequentially radially along the arc, about the optional position as center, so as to disappear to outside a display area.

In still another aspect, the present invention provides an address signal generating method for generating an address signal for reading out picture signals from a frame buffer, in which the address signal generating method comprises an address signal generating step of generating a readout address signal for the picture signals stored in the frame buffer so that, by flipping a picture, ruptured with an optional position of a picture, corresponding to the picture signals stored in the frame buffer, as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point along a plane parallel to the first virtual plane, such a special effect will be obtained in which the picture on the first virtual plane is peeled off sequentially radially along the arc, about the optional position as center, so as to disappear to outside a display area.

In still another aspect, the present invention provides an address signal generating program for having a computer execute a process of generating an address signal for reading out picture signals from a frame buffer, in which the process comprises an address signal generating step of generating a readout address signal for the picture signals stored in the frame buffer so that, by flipping a picture, ruptured with an optional position of a picture corresponding to the picture signals stored in the frame buffer as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point along a plane parallel to the first virtual plane, such a special effect will be obtained in which the picture on the first virtual plane is peeled off sequentially radially along the arc, about the optional position as center, so as to disappear to outside a display area.

In still another aspect, the present invention provides a special effect device in which picture signals are read out from a frame buffer based on an address signal to impart a desired special effect to the picture signals read out from the frame buffer. The special effect device comprises address signal generating means for generating a readout address signal for the picture signals stored in the frame buffer so that, by flipping a picture, ruptured with an optional position of a picture, corresponding to the picture signals stored in the frame buffer, as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point as if the picture corresponding to the rupture point is rolled along the other arc, such a special effect will be obtained in which the picture on the first virtual plane is peeled off sequentially radially along the arc, about the optional position as center, so as to disappear to outside a display area.

In a still another aspect, the present invention provides an address signal generating device for generating an address signal from a frame buffer, in which the address signal generating device comprises address signal generating means for generating readout address signals for the picture signals stored in the frame buffer so that, by flipping a picture, ruptured with an optional position of a picture, corresponding to the picture signals stored in the frame buffer. As a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point as if the picture corresponding to the rupture point is rolled along the other arc, such a special effect will be obtained in which the picture on the first virtual plane is peeled off sequentially radially along the arc, about the optional position as center, so as to disappear to outside a display area.

In still another aspect, the present invention provides an address signal generating method for generating an address signal from a frame buffer, in which the special effect method comprises an address signal generating step of generating readout address signals for the picture signals stored in the frame buffer so that, by flipping a picture, ruptured with an optional position of a picture, corresponding to the picture signals stored in the frame buffer, as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point as if the picture corresponding to the rupture point is rolled along the other arc, such a special effect will be obtained in which the picture on the first virtual plane is peeled off sequentially radially along the arc, about the optional position as center, so as to disappear to outside a display area.

In still another aspect, the present invention provides an address signal generating program for having a computer execute a process of generating an address signal for reading out picture signals from a frame buffer, in which the process comprises an address signal generating process of generating readout address signals for the picture signals stored in the frame buffer so that, by flipping a picture, ruptured with an optional position of a picture, corresponding to the picture signals stored in the frame buffer, as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point as if the picture corresponding to the rupture point is rolled along the other arc, such a special effect will be obtained in which the picture on the first virtual plane is peeled off sequentially radially along the arc, about the optional position as center, so as to disappear to outside a display area.

In still another aspect, the present invention provides a special effect device in which picture signals are read out from a frame buffer based on an address signal to impart a desired special effect to the picture signals read out from the frame buffer. The special effect device comprises address signal generating means for generating a readout address signal for the picture signals stored in the frame buffer so that a figure corresponding to a picture stored in the frame buffer folded n times from an end of the picture with a straight line(s) defined at an optional position of the picture stored in the frame buffer for dividing the picture into n portions, as a folding boundary line(s), will be produced, where n is a natural number.

In still another aspect, the present invention provides an address signal generating device for generating an address signal for reading out picture signals from a frame buffer, in which the address signal generating device comprises address signal generating means for generating a readout address signal for the picture signals stored in the frame buffer so that a figure corresponding to a picture stored in the frame buffer folded n times from an end of the picture with a straight line(s) defined at an optional position of the picture stored in the frame buffer for dividing the picture into n portions, as a folding boundary line(s), will be produced, where n is a natural number.

In still another aspect, the present invention provides an address signal generating method for generating an address signal for reading out picture signals from a frame buffer, in which the address signal generating method comprises an address signal generating step of generating a readout address signal for the picture signals stored in the frame buffer so that a figure corresponding to a picture stored in the frame buffer folded n times from an end of the picture with a straight line(s) defined at an optional position of the picture stored in the frame buffer for dividing the picture into n portions, as a folding boundary line(s), will be produced, where n is a natural number.

In yet another aspect, the present invention provides an address signal generating program for having a computer execute a process of generating an address signal for reading out picture signals from a frame buffer, in which the process comprises an address signal generating process of generating readout address signals for the picture signals stored in the frame buffer so that a figure corresponding to a picture stored in the frame buffer folded n times from an end of the picture with a straight line(s) defined at an optional position of the picture stored in the frame buffer for dividing the picture into n portions, as a folding boundary line(s), will be produced, where n is a natural number.

According to the present invention, as described above, the address signal generating means generates a readout address signal for the picture signals stored in the frame buffer, so that, by flipping a picture, ruptured with an optional position of a picture, corresponding to the picture signals stored in the frame buffer, as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point along a plane parallel to the first virtual plane, such a special effect will be obtained in which the picture on the first virtual plane is peeled off sequentially radially along the arc, about the optional position as center, so as to disappear to outside a display area, whereby an entirely new special picture effect may be achieved.

According to the present invention, as described above, address signal generating means generates a readout address signal for the picture signals stored in the frame buffer so that, by flipping a picture, ruptured with an optional position of a picture, corresponding to the picture signals stored in the frame buffer, as a rupture point, for extending along a curve formed by an arc of a circle of a radius of an optional size, defined on a second virtual plane perpendicular to a first virtual plane to which belongs the picture, and by moving, after the picture corresponding to the rupture point has reached a height of the diameter of the circle on the second virtual plane, the picture corresponding to the rupture point as if the picture corresponding to the rupture point is rolled along the other arc, such a special effect will be obtained in which the picture on the first virtual plane is peeled off sequentially radially along the arc, about the optional position as center, so as to disappear to outside a display area, whereby an entirely new special picture effect may be achieved.

According to the present invention, as described above, address signal generating means generates a readout address signal for the picture signals stored in the frame buffer so that a figure corresponding to a picture stored in the frame buffer folded n times from an end of the picture with a straight line(s) defined at an optional position of the picture stored in the frame buffer for dividing the picture into n portions, as a folding boundary line(s), will be produced, where n is a natural number.

BRIEF DESCRIPTION OF THE DRAWINGS

FIG. 5 shows parameters supplied to the read address generator in carrying out the flipping effect.

FIG. 6 illustrates polar coordinate transformation in the flipping effect.

FIG. 18 illustrates parameters supplied to the read address generator when carrying out the tubular flipping effect.

FIG. 19 illustrates polar coordinate transformation in the tubular flipping effect.

FIG. 20 illustrates address conversion in the tubular flipping effect.

FIG. 25 shows an example of a picture subjected to a folding effect by the special picture effect.

FIG. 26 shows parameters supplied to a read address generator in carrying out the folding effect.

FIG. 27 shows a first range of the OverSide in one folding.

DESCRIPTION OF PREFERRED EMBODIMENTS

Figure 1:
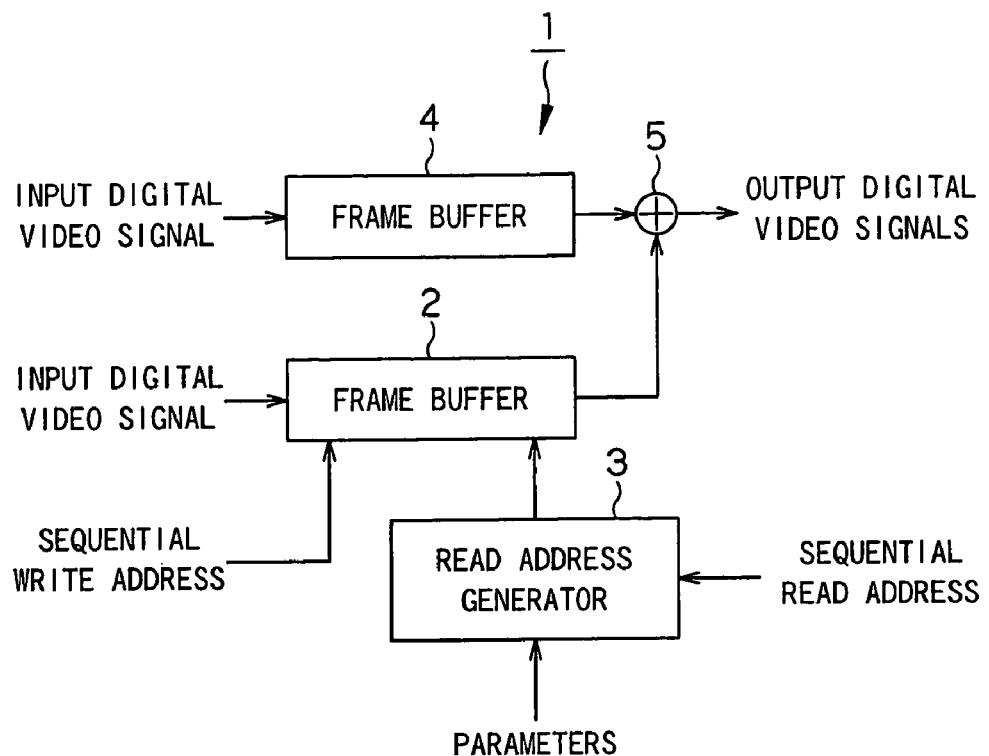
FIG. 1 illustrates the structure of a special picture effect device embodying the present invention.

Referring to the drawings, a special effect device, an address signal generating device, an address signal generating method and an address signal generating program are now explained in detail.

Referring first to FIG. 1, the structure of a special picture effect device, embodying the present invention, is explained. The special picture effect device 1 is a device supplied with digitized video signals to issue an output so that a preset special picture effect will be obtained. The special picture effect device 1 employs a read address control system as a system for applying the special picture effect to the input digital video signals. The read address control system is able to change the address which is valid in reading out pixel data making up a picture frame to achieve a variegated special picture effect. In the following description, the special picture effect is referred to simply as a special effect.

The special picture effect device 1, shown in FIG. 1, includes a frame buffer 2, a read address generator 3, a frame buffer 4 and a picture synthesizing unit 5

The frame buffer 2 is a buffer memory for transient storage of the input digital video signals on the frame basis. The frame buffer 2 is able to store a plural number of frames, depending on the memory capacity. The digital video signals, supplied to the frame buffer 2, are given sequential write addresses (X, Y) indicating the positions on a frame as the two-dimensional space so as to be then stored in the frame buffer 2. That is, the digital video signals, supplied to the frame buffer 2, are stored as picture data in addresses (X, Y) in the memory space in the frame buffer 2.

Meanwhile, the write addresses (X, Y) are the same as the addresses (X, Y). That is, the write addresses (X, Y) are the addresses used in writing the digital video signals in the frame buffer 2 and become the addresses (X, Y) after having been written in the frame buffer 2. In the following description, it is assumed that frame-based picture data have already been stored in the frame buffer 2, and that the addresses in which are stored the picture data are the addresses (X, Y).

It is also assumed that the picture data stored in the frame buffer 2 has undergone the cropping processing of extracting picture data of an area which becomes valid in executing the special effect as later explained.

The read address generator 3 calculates the read addresses in reading out the picture data stored in the frame buffer 2, depending on the type of the special effect, in accordance with the read address control system employed in the special picture effect device 1. Using the so calculated read addresses, the read address generator 3 reads out the picture data stored in the frame buffer 2 to permit outputting of the picture to which the special effect has been applied.

Specifically, the read address generator 3 converts the sequential read addresses (x, y), used in reading out the picture data from the frame buffer 2, into the addresses (X, Y) of the picture data stored in the frame buffer 2, by calculations employing the parameters which differ with the type of the special effect. The read address generator 3 specifies the picture data, stored in the frame buffer 2, with the addresses (X, Y) converted from the sequential read addresses (x, y), to permit the picture data to be sequentially output in order to output the picture processed with the special effect.

Figure 2:
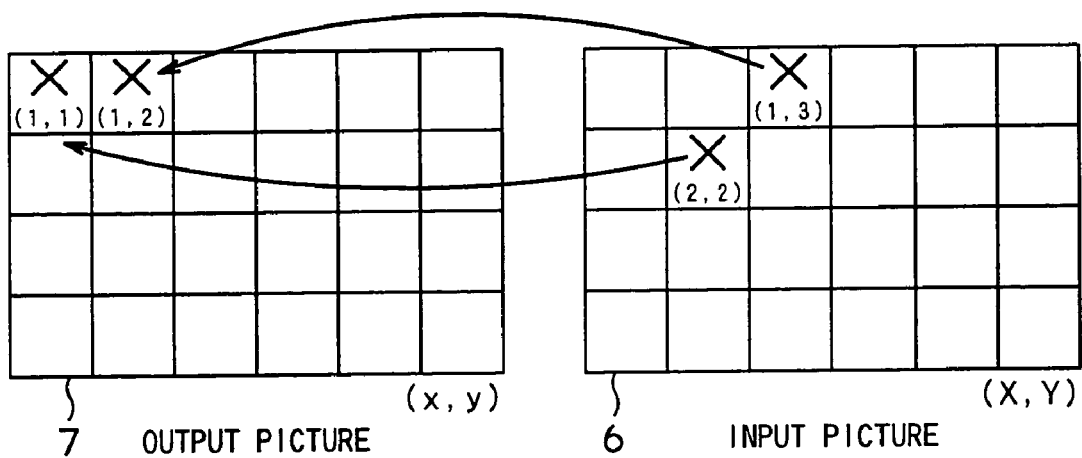
FIG. 2 shows a specified example for illustrating a read address control system as used in the special picture effect device.

For example, consider a picture frame 6 and a picture frame 7 shown in FIG. 2. The picture frame 6 is picture data stored in the frame buffer 2. The picture frame 7 is picture data read out from the frame buffer 2 such as to produce a special effect. That is, the picture frame 6 stored in the frame buffer 2 is read out with the address (X, Y) designated by the read address generator 3 to output the picture frame 7 to which the special effect has been applied.

In case the picture frame 6 and the picture frame 7 are each made up by picture data of (4×6) matrix, the picture frame 7 has the read addresses (x, y) sequentially designated in the horizontal scanning direction in a sequence of (1, 1) component, (1, 2) component and so forth. Responsive to this designation of the read addresses (x, y), the read address generator 3 determines the addresses (X, Y) of the picture frame 6 stored in the frame buffer 2, using the parameters which differ with the type of the special effect, in order to read out the picture data.

In FIG. 2, if, in order to form the picture frame 7, processed with the special effect, the read address (1, 1) is specified by the read address generator 3, the picture data stored in the address (2, 2) of the picture frame stored in the frame buffer 2 is read out. If the read address (1, 2) is specified, the picture data stored in the address (1, 3) of the picture frame is read out.

In this manner, the picture frame 6 stored in the frame buffer 2 is output as the picture frame 7, to which the special effect has been applied.

Thus, the special picture effect device 1, described above, is able to read out the picture data, stored in the frame buffer 2, with the address (X, Y) designated by the read address generator 3, to permit the outputting of a picture to which the special effect has been applied.

The detailed operation to be performed in the read address generator 3 will be explained later when the special effect is subsequently explained.

The special picture effect device 1 also includes the frame buffer 4 and the picture synthesizing unit 5. Similarly to the frame buffer 2, the frame buffer 4 is a buffer for transiently storing picture data on the frame basis. The picture data, stored in the frame buffer 4, is output as a picture not processed with the special effect, and is synthesized to an output picture from the frame buffer 2 by the picture synthesizing unit 5.

By providing the frame buffer 4 and the picture synthesizing unit 5, such outputting is possible in which, in case the output picture from the frame buffer 2, processed with the special effect, should disappear from the picture surface, an output picture from the frame buffer 4 appears on the background. An efficacious technique may be realized in case it is desirable to emphasize a scene change by the special effect.

There are plural special effects realized by the special picture effect device 1, as now explained in detail.

The special effects, that may be realized with the special picture effect device 1, may be enumerated by 1) a flipping effect, 2) a tubular flipping effect and 3) a folding effect. These special effects are now respectively explained.

1. Flipping Effect

Figure 3:
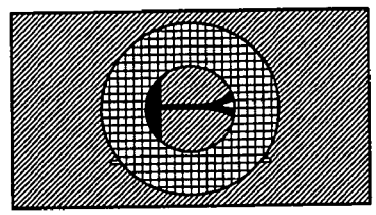
FIG. 3 shows an example of a picture obtained on applying a flipping effect by the special picture effect device.

The flipping effect is such a special effect in which a picture is flipped as if it is peeled off from the underground as from a point of rupturing the picture to cause the background to appear as it is read out from the frame buffer 4, as shown in FIG. 3.

Figure 4A:
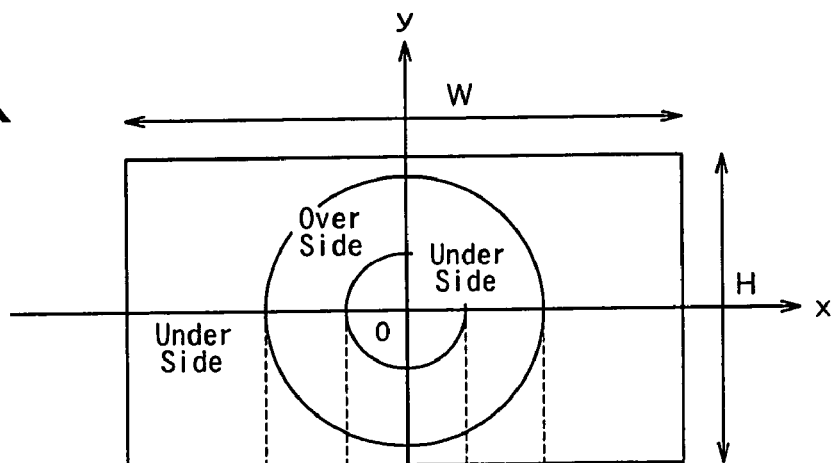
FIG. 4 illustrates the flipping effect.
Figure 4B:
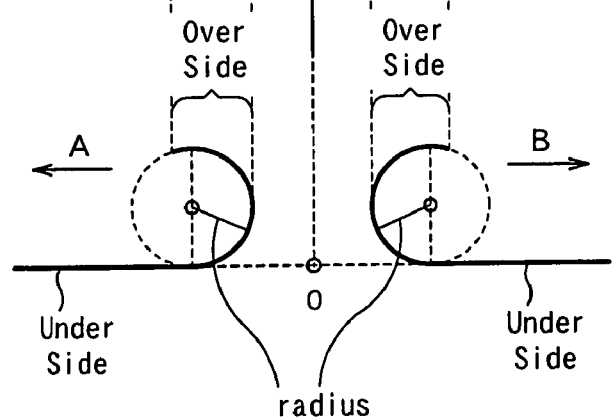

If the picture subjected to the flipping effect, having the start point of the picture (rupturing point) as a point of origin, is shown as in FIG. 4a, the virtual cross-section is as shown in FIG. 4b. The flipping effect is such an effect in which the picture is flipped to form a circle having a radius (fixRadius×picture height H) as a radius, in a virtual cross-sectional view, and in which, after getting to the height of the diameter of the circle, the picture is uplifted and flipped along the tangential line of the circle and along arrows A and B, as shown in FIG. 4b. The uplifted and flipped picture is the OverSide, with the unflipped picture being an UnderSide.

The parameters used in the flipping effect shown in FIG. 5 are now explained. In the flipping effect, the parameters showing the picture movement and the parameters for setting the light source and the color in illuminating the picture are used. First, the parameters pertinent to the picture movement are explained. The parameters used in causing movement of the picture are fixRadius, fixCenter and trans. The parameters fixCenterX and the fixCenterY are used in determining the coordinate axes of the picture. When both are zero, which is a default, the center of the picture is the point of origin, such that the picture is flipped from the point of origin. The parameter fixRadius determines the ratio of the radius of the circle. The maximum value of the radius of the circle, that is, the radius when fixRadius=1, is the picture height H.

A parameter trans is a parameter containing the time element which accords the quantity of movement of a picture to be moved. If the parameter value is 0 or 1, the picture is not moved at all or disappears from the picture surface, respectively.

Specifically, the parameter trans is defined so that trans= (number of frames that took place as from the starting frame of the processing)/(total number of frames processed). For example, if it is desired to switch from the picture A to the picture B in e.g. a time of 30 frames, the values of trans=0/30, 1/30, 2/30, . . . , 29/30, 30/30 are received sequentially to carry out the processing on the frame basis.

The parameters used for setting the light source and the color in illuminating the picture are explained. The parameter fixLightAngle is used for setting the angle of incidence of the light source to the picture. A parameter fixDiffuseLight Ratio is used for setting the intensity of the light source, a parameter fixReverseHighlight is used for setting the highlight quantity of the flipped picture, a parameter fixReverseSmoothness is used for setting the diffusion of reflection of the flipped picture, a fixMatteRatio is used for setting how much light is transmitted through the flipped picture, a parameter vMatteColor is used for setting the color of the flipped picture, and vLightColor is used for setting the color of the light source.

When the sequential read address (x, y) is set for the read address generator 3, the address (X, Y) of the picture data, read out from the frame buffer 2, is found on conversion by the following process:

First, using the equation (1-1):

$$x0 = x - cx$$

$$y0 = y - cy \qquad (1\text{-}1)$$

the conversion for setting the picture flipping point as the point of origin is carried out to set the read address (x, y) to the address (x0, y0).

Then, using the equation (1-2):

$$r = \sqrt{x0^2 + y0^2} \qquad (1\text{-}2)$$

$$\theta = \arctan\left(\frac{y0}{x0}\right)$$

the rectangular coordinate system is transformed into the polar coordinate system.

This converts the address (x0, y0) to the address (r, θ), as shown in FIG. 6.

Figure 7:
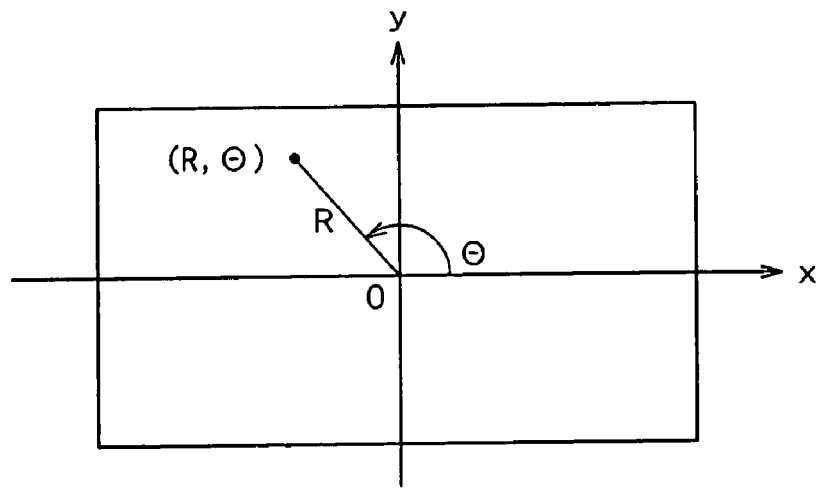
FIG. 7 illustrates address conversion in the flipping effect.

The address (r, θ) of the OverSide of the picture is then converted into the address (R, Θ), as shown in FIG. 7, by the following equation (1-3):

$$R = f_1(r)$$

$$\Theta = \theta \qquad (1\text{-}3)$$

while the address (r, θ) of the UnderSide of the picture is then converted into the address (R, Θ), as shown in FIG. 7, by the following equation (1-4):

$$R = f_2(r)$$

$$\Theta = \theta \qquad (1\text{-}4).$$

Meanwhile, the function $f_1(r)$ in the equation (1-3) and the function $f_2(r)$ in the equation (1-4) are represented by the equations (1-5):

$$f_1(r) = \begin{cases} \text{Max} & (0 \leq r < t_r - \text{radius}) \\ t_r - \text{radius} \times \left(\pi + \arcsin\left(\frac{t_r - r}{\text{radius}}\right)\right) & (t_r - \text{radius} \leq r < t_r) \\ 2 \times t_r - \text{radius} \times \pi - r & (t_r \leq r) \end{cases} \qquad (1\text{-}5)$$

where
$t_r$=trans×(radius+maximum value of the distance from the center to each apex point)
radius=fixRadius×picture height
and by the equations (1-6):

$$f_2(r) = \begin{cases} \text{Max} & (0 \leq r < t_r - \text{radius}) \\ t_r - \text{radius} \times \arcsin\left(\frac{t_r - r}{\text{radius}}\right) & (t_r - \text{radius} \leq r < t_r) \\ r & (t_r \leq r) \end{cases} \qquad (1\text{-}6)$$

where
$t_r$=trans×(radius+maximum value of the distance from the center to each apex point)
radius=fixRadius×picture height, respectively.

In the equations (1-5) and (1-6), Max indicates that it is designating an address other than the picture that may be designated by the address (X0, Y0). For example, if Max designates the address where there is stored as blue picture stored in the frame buffer 2, another picture may readily be synthesized to an area which has become the aforementioned Max, using the above picture as a key signal.

Figure 8:
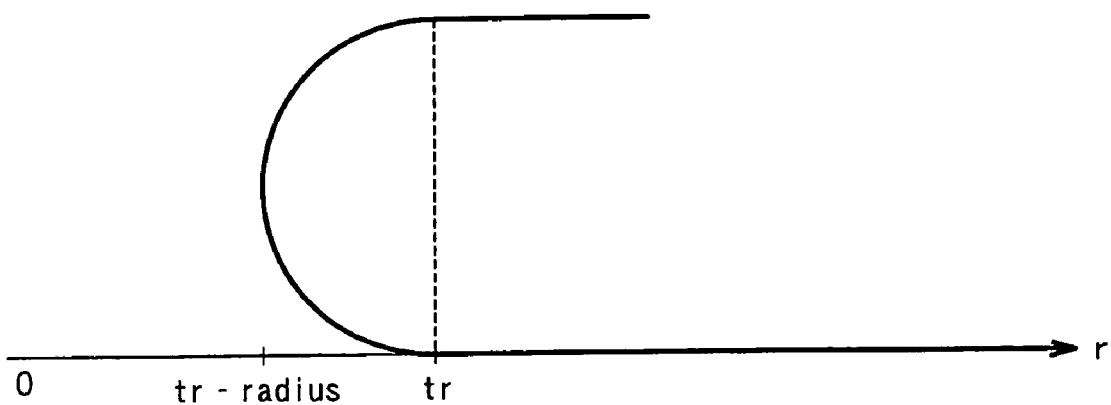
FIG. 8 illustrates a range of F.
Figure 9:
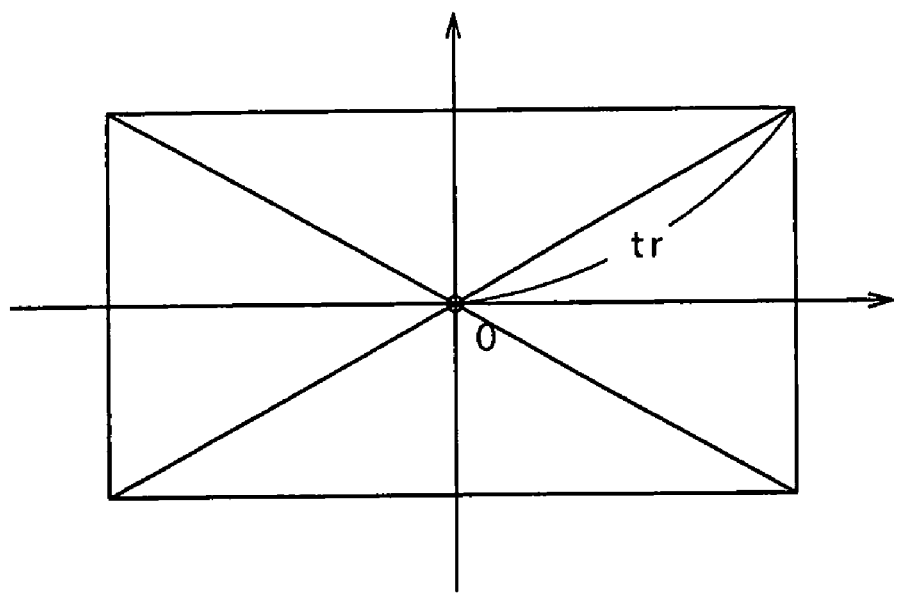
FIG. 9 shows a first specified example for illustrating $t_r$.

On the other hand, if the picture is flipped, the result is as shown in FIG. 8, so that the functions $f_1(r)$ and $f_2(r)$, shown in the equations (1-5) and (1-6), respectively, use the equations which differ with the range of r. It is noted that $t_r$ denotes a distance of flipping a picture such that, with trans=1.0, the picture disappears from the picture surface. For example, if, with the picture width and the picture height are W and H, respectively, (fixCenterX, fixCenterY)=(0.0, 0.0), that is, the point of origin is at the center of the picture, $t_r$ is as shown below (see FIG. 9). At this time, $t_r$ may be found by the following equation (1-7):

$$t_r = \text{trans} \times (\text{radius} + \sqrt{(0.5W)^2 + (0.5H)^2}) \qquad (1\text{-}7).$$

Figure 10:
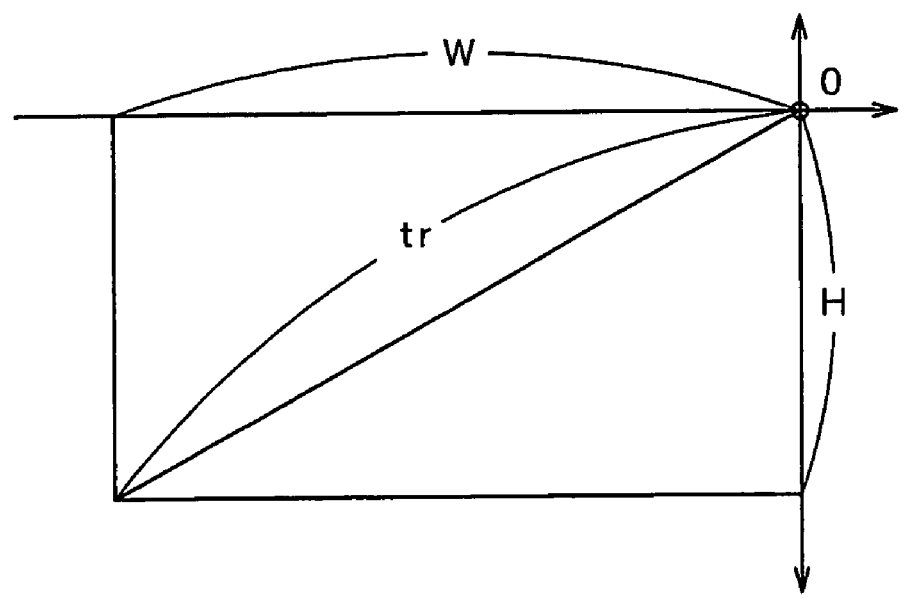
FIG. 10 shows a second specified example for illustrating $t_r$.

If (fixCenterX, fixCenterY)=(1.0, 1.0), that is, if the point of origin is at the center of the picture, $t_r$ is as shown below (see FIG. 10). At this time, $t_r$ may be found by the following equation (1-8):

$$t_r = \text{trans} \times (\text{radius} + \sqrt{W^2 + H^2}) \qquad (1\text{-}8).$$

The address (R, Θ), obtained on rotation, then is converted the polar coordinate system to the address (X0, Y0) of the rectangular coordinate system, using the equation (1-9):

$$X0 = R \cos \Theta$$

$$Y0 = R \sin \Theta \qquad (1\text{-}9).$$

Since the address (X0, Y0) is an address in case the flipping point of the picture is the point of origin in the rectangular coordinate system, the address (X, Y) in case the picture flipping point has been moved to (cx, cy) is found, using the equation (1-10):

$$X = X0 + cx$$

$$Y = Y0 + cy \qquad (1\text{-}10).$$

In this manner, the read address generator 3 converts the read address (x, y) to the address (X, Y) of the picture data stored in the frame buffer 2.

The position where the shadow is cast in the flipping effect is explained. Since the flipping effect is a special effect in which a picture is flipped and moved on the two-dimensional plane, the presence of a shadow created by an imaginary light source may further be taken into account to represent a more realistic flipping effect.

If the angle of light incidence is ø and the coordinate of an end of a shadow is $r_{shadow}$, the shadow is changed in the following manner with the degree of the picture flipping θ. Meanwhile, with $0 \leq \theta \leq \pi$, $\theta = t_r/\text{radius}$.

(1) With $0 \leq \theta \leq \text{ø}$

Figure 11:
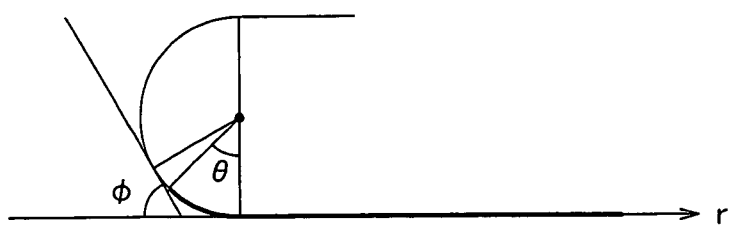
FIG. 11 illustrates address transformation.

There is no shadow cast, as shown in FIG. 11.

(2) With $2\text{ø} < \theta \leq 2\text{ø}$

Figure 12:
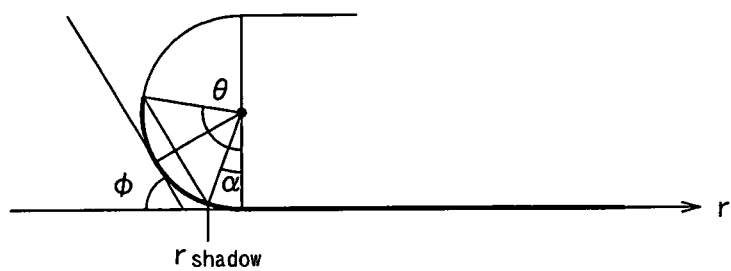
FIG. 12 illustrates a shadow formed in a first area in a flipping effect.

A shadow is cast on a curved surface, as shown in FIG. 12, and $r_{shadow}$ may be found using the equation (1-11):

$$r_{shadow} = t_r - \text{radius} \times \sin \alpha$$
$$= t_r - \text{radius} \times \sin(2\phi - \theta). \quad (1\text{-}11)$$

(3) With $2\phi < \theta \leq \pi$

Figure 13:
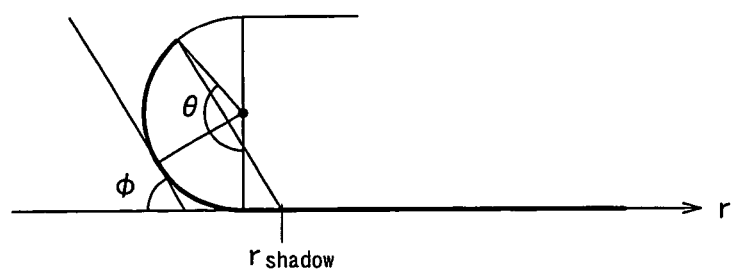
FIG. 13 illustrates a shadow formed in a second area in a flipping effect.

A shadow of a curved surface is cast on a plane, as shown in FIG. 13, and $r_{shadow}$ may be found using the equation (1-12):

$$r_{shadow} = t_r + \text{radius}\left(\frac{1 - \cos\theta}{\tan\varphi} - \sin\theta\right). \quad (1\text{-}12)$$

(4) With $\pi < \theta$

Figure 14:
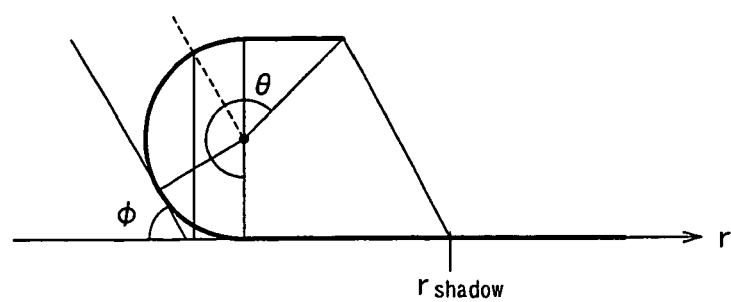
FIG. 14 illustrates a shadow formed in a third area in a flipping effect.

A shadow of a planar surface is cast on a plane, as shown in FIG. 14, and $r_{shadow}$ may be found using the equation (1-13):

$$r_{shadow} = 2 \times t_r + \text{radius}\left(\frac{2}{\tan\varphi} - \pi\right). \quad (1\text{-}13)$$

Thus, if, in the flipping effect, the position of the shadow is calculated, depending on the degree of flipping of the picture, it is possible to represent a more realistic flipping effect.

The hardware structure of the read address generator 3 in carrying out the flipping effect is now explained with reference to FIG. 15.

The read address generator 3 includes plural modules, such as an adder-multiplier and a polar coordinate to rectangular coordinate converter, and executes the above calculations, based on the combination of these modules.

Figure 15:
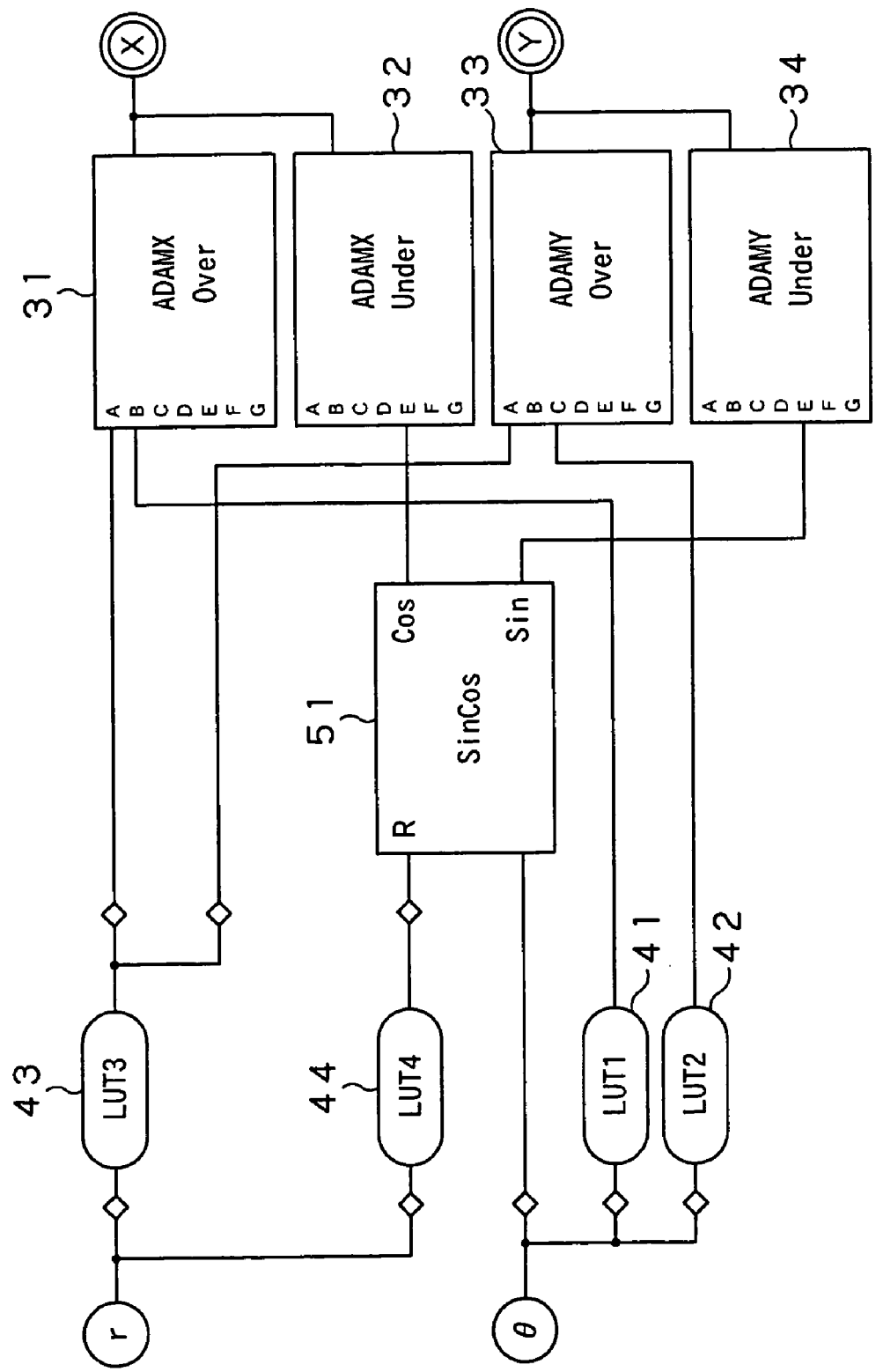
FIG. 15 illustrates the hardware structure of a read address generator for realizing the flipping effect.
Figure 16:
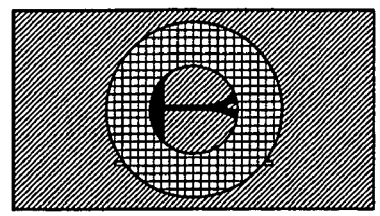
FIG. 16 illustrates an example to which a tubular flipping effect has been applied by the special picture effect.

In executing the flipping effect, LUTs (look-up tables) 41 to 44, an ADAMX (Over) 31, an ADAMX (Under) 32, an ADAMY (Over) 33 an ADAMY (Under) 34 and a polar converter 51, are used, as shown in FIG. 15.

The LUTs 41 to 44 are RAM (random access memory) tables, referred to by an address designated by cross-points indicated by diamond-shaped marks in the drawing. The data are set by a central processing unit (CPU), not shown. In the LUTs 41 to 44, $\cos\theta$, $\sin\theta$, $f_1(r)$ of the equation (1-5) and $f_2(r)$ of the equation (1-6) are set, respectively, by the central processing unit (CPU), not shown.

The ADAMX (Over) 31, ADAMY (Under) 32, ADAMY (Over) 33 and the ADAMY (Under) 34 are each provided with terminals A to G, and apply the calculations of $(A+B) \times (C+D)+E+F+G$ by addition and multiplication. For the terminals A to G, constant numbers or the cross-points indicated by diamond-shaped marks in the drawing may be designated.

The operation of conversion from the read address (x, y) to the address (X, Y) by the above-described read address generator 3 is now explained. It is noted that the calculations shown in the equations (1-1) and (1-2) are carried out on the read address (x, y) as pre-processing by the matrix calculations, and that the address (r, θ) as converted to the polar coordinate system is entered to the read address generator 3.

The ADAMX (Over) 31 multiplies the function f1(r), which is an output from the LUT 43 and which is an address R, with the function cos Θ, which is an output of the LUT 41, to execute (1-9), in order to calculate the address X0. This address is summed to cx to execute the equation (1-10) to calculate the address X of the OverSide.

The ADAMY (Over) 33 multiplies the function $f_1(r)$, which is an output from the LUT 43 and which is an address R, with the function sin θ, which is an output of the LUT 42, to execute (1-4), in order to calculate the address Y0. This address is summed to cy to execute the equation (1-10) to calculate the address Y of the OverSide.

Since $R=f_2(r)$ and $\theta=\Theta$, from the equation (1-4), output from the LUT 44, the coordinate converter 51 executes (1-9), on coordinate conversion, to find the address (X0, Y0)=(R cos Θ, R sin Θ, R cos Θ and R sin Θ are supplied to the ADAMX (Under) 32 and to the ADAMY (Under) 34, respectively.

The ADAMX (Under) 32 sums cx to R cos Θ to execute (1-10) to calculate the address X of the UnderSide.

The ADAMY (Under) 34 sums cy to R sin Θ to execute (1-10) to calculate the address X of the UnderSide.

Meanwhile, in an area where the address (X, Y) of the OverSide as calculated is overlapped with the address (X, Y) of the UnderSide, the address (X, Y) of the OverSide is output.

In this manner, the special picture effect device 1 uses the hardware, forming the read address generator 3, by a suitable combination, for converting the read address (x, y), entered to the read address generator 3, into the address (X, Y) usable for reading out a picture corresponding to the picture stored in the frame buffer 2 and which has been processed with the flipping effect.

2. Tubular Flipping Effect

The flipping effect is such a special effect in which a picture is flipped as if it is peeled off from the underground as from a point of rupturing the picture to cause the background picture to appear as it is read out from the frame buffer 4, as shown in FIG. 3.

Figure 17A:
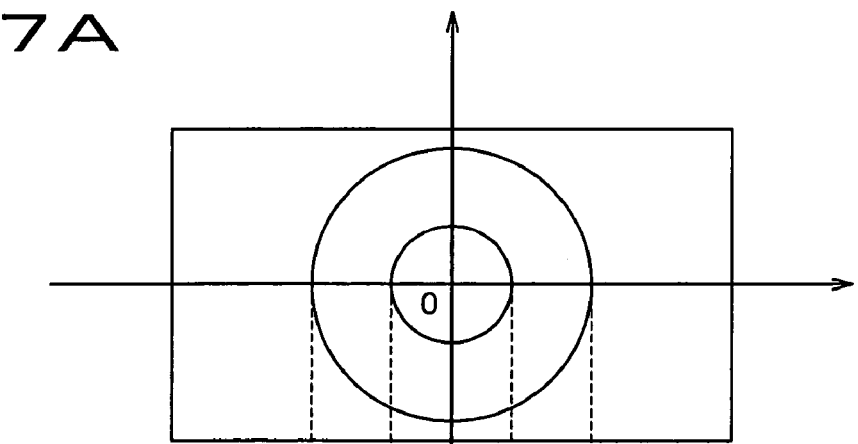
FIG. 17 illustrates the tubular flipping effect.
Figure 17B:
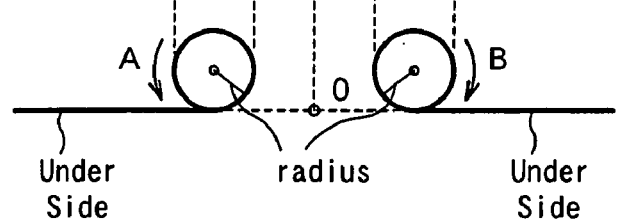

If the picture subjected to the flipping effect, having the start point of the picture subjected to the tubular flipping effect (rupturing point) as a point of origin, is as shown in FIG. 17a, the virtual cross-section is as shown in FIG. 4b. The flipping effect is such an effect in which the picture is flipped to form a circle having a radis (fixRadius×picture height H) as a radius, in a virtual cross-sectional view, and in which, after getting to the height of the diameter of the circle, the picture is uplifted and flipped along the tangential line of the circle and along arrows A and B, as shown in FIG. 17b. The uplifted and flipped picture portion is the OverSide, with the unflipped picture portion being an UnderSide. The difference between the flipping effect and the tubular flipping effect is that the proceeding direction of the flipped picture portion is the tangential direction and the circumferential direction in the former and latter, respectively.

The parameters used in the flipping effect are now explained with reference to FIG. 18. In the tubular flipping effect, the parameters showing the picture movement and the parameters for setting the light source and the color in illuminating the picture are used. First, the parameters pertinent to the picture movement are explained. The parameters used in causing movement of the picture are fixRadius, fixCenterX, fixCenterY and trans. The parameters fixCenterX and the fixCenterY are used in determining the coordinate axes of the picture. When both are zero, which is a default, the center of the picture is the point of origin, such that the picture is flipped from the point of origin. The parameter fixRadius in the tubular flipping effect determines the ratio of the radius of the circle. The maximum value of the radius of the circle, that is, the radius when fixRadius=1, is the picture height H.

The parameter trans is a parameter containing the time element which accords the quantity of movement of a picture to be moved. If the parameter value is 0 or 1, the picture is not moved at all or disappears from the picture surface, respectively.

Specifically, the parameter trans is defined so that trans= (number of frames that took place as from the starting frame of the processing)/(total number of frames processed). For example, if it is desired to switch from the picture A to the picture B in e.g. a time of 30 frames, the values of trans=0/30, 1/30, 2/30, . . . , 29/30, 30/30 are received sequentially to carry out the processing on the frame basis.

The parameters used for setting the light source and the color in illuminating the picture are explained. The parameter fixLightAngle is used for setting the angle of incidence of the light source to the picture. A parameter fixDiffuseLightRatio is used for setting the intensity of the light source, a parameter fixReverseHighlight is used for setting the highlight quantity of the flipped picture, a parameter fixReverseSmoothness is used for setting the diffusion of reflection of the flipped picture, a fixMatteRatio is used for setting how much light is transmitted through the flipped picture, a parameter vMatteColor is used for setting the color of the flipped picture, and vLightColor is used for setting the color of the light source.

When the sequential read address (x, y) is set for the read address generator 3, the address (X, Y) of the picture data, read out from the frame buffer 2, is found on conversion by the following process:

First, using the equation (2-1):

$$x0 = x - cx$$
$$y0 = y - cy \quad (2\text{-}1)$$

the conversion for setting the picture flipping point as the point of origin is carried out to set the read address (x, y) to the address (x0, y0).

Then, using the equation (2-2):

$$r = \sqrt{x0^2 + y0^2} \quad (2\text{-}2)$$
$$\theta = \arctan\left(\frac{y0}{x0}\right)$$

the rectangular coordinate system is transformed into the polar coordinate system.

This converts the address (x0, y0) to the address (r, θ), as shown in FIG. 6.

The address (r, θ) of the OverSide of the picture is then converted into the address (R, Θ), as shown in FIG. 20, by the following equation (2-3):

$$R = f_1(r)$$
$$\Theta = \theta \quad (2\text{-}3)$$

while the address (r, θ) of the UnderSide of the picture is then converted into the address (R, Θ), as shown in FIG. 20, by the following equation (2-4):

$$R = f_2(r)$$
$$\Theta = \theta \quad (2\text{-}4).$$

Meanwhile, the function $f_1(r)$ in the equation (2-3) and the function $f_2(r)$ in the equation (2-4) are represented by the equations (2-5):

$$f_1(r) = \begin{cases} \text{Max} & (0 \le r < t_r - \text{radius}) \\ t_r - \text{radius} \times \left(\pi + \arcsin\left(\frac{t_r - r}{\text{radius}}\right)\right) & (t_r - \text{radius} \le r < t_r) \\ t_r - \text{radius} \times \left(\pi - \arcsin\left(\frac{t_r - r}{\text{radius}}\right)\right) & (t_r \le r) \end{cases} \quad (2\text{-}5)$$

where $t_r$=trans×(radius+maximum value of the distance from the center to each apex point of the picture)

radius=fixRadius×picture height and by the equations (2-6):

$$f_2(r) = \begin{cases} \text{Max} & (0 \le r < t_r - \text{radius}) \\ t_r - \text{radius} \times \arcsin\left(\frac{t_r - r}{\text{radius}}\right) & (t_r - \text{radius} \le r < t_r) \\ r & (t_r \le r) \end{cases} \quad (2\text{-}6)$$

where $t_r$=trans×(radius+maximum value of the distance from the center to each apex point of the picture)

radius=fixRadius×picture height, respectively.

In the equations (2-5) and (2-6), Max indicates that it is designating an address other than the picture that may be designated by the address (X0, Y0). For example, if Max designates the address where there is stored a blue picture stored in the frame buffer 2, another picture may readily be synthesized to an area which has become the aforementioned Max, using the above picture as a key signal.

In the tubular flipping effect, the picture flipped is as shown in FIG. 8, as described above. Thus, the functions $f_1(r)$ and $f_2(r)$ use respective different equations, depending on the range of r. As for $t_r$, what has been said in connection with the flipping effect, and hence the explanation on $t_r$ is omitted for simplicity.

The address (R, Θ) obtained is then converted from the polar coordinate system to the address (X0, Y0) of the rectangular system, using the equation (2-7):

$$X0 = R \cos \Theta$$
$$Y0 = R \sin \Theta \quad (2\text{-}7).$$

In the rectangular coordinate system, the address (X0, Y0) is an address in case the point of picture flipping is the point of origin. Thus, the address (X, Y) in case the picture flipping point has been moved to (cx, cy) is found, using the equation (2-8):

$$X = X0 + cx$$
$$Y = Y0 + cy \quad (2\text{-}8)$$

In this manner, the read address generator 3 converts the read address (x, y) to the read address (X, Y) of picture data stored in the frame buffer 2.

The position where the shadow is cast in the tubular flipping effect is explained. Since the flipping effect is a special effect in which a picture is flipped and moved on the two-dimensional plane, the presence of a shadow created by an imaginary light source may further be taken into account to realize a more realistic flipping effect.

If the angle of light incidence is ø and the coordinate of an end of a shadow is r, the shadow is changed in the following manner with the degree of the picture flipping θ. Meanwhile, with $0 \leq \theta \leq \pi$, $\theta = t_r/radius$.

(1) With $0 \leq \theta \leq \varnothing$

Figure 21:
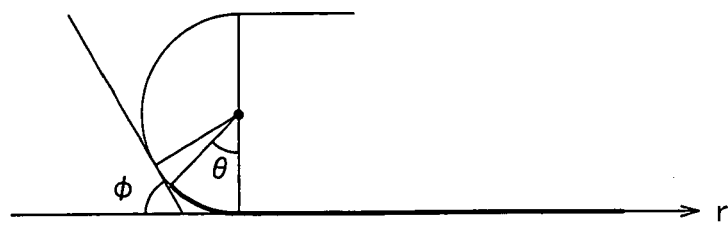
FIG. 21 illustrates a shadow formed in a first area in the tubular flipping effect.

There is no shadow cast, as shown in FIG. 21.

(2) With $2\varnothing < \theta \leq 2\varnothing$

Figure 22:
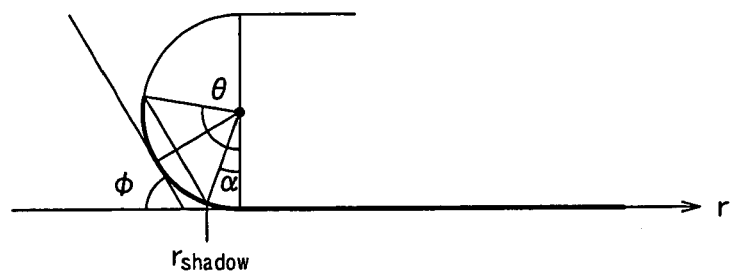
FIG. 22 illustrates a shadow formed in a second area in the tubular flipping effect.

A shadow is cast on a curved surface, as shown in FIG. 22, and $r_{shadow}$ may be found using the equation (2-9):

$$r_{shadow} = t_r - radius \times \sin \alpha$$

$$= t_r - radius \times \sin(2\phi - \theta). \quad (2\text{-}9)$$

(3) With $2\varnothing < \theta \leq \pi + \theta$

Figure 23:
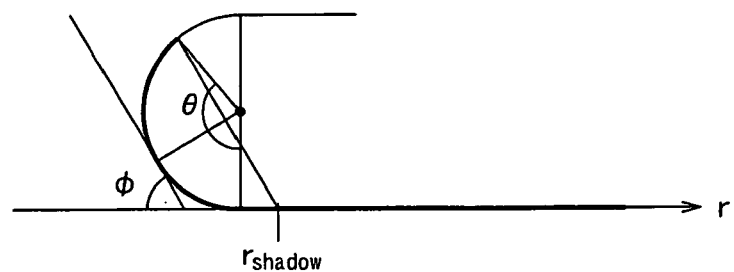
FIG. 23 illustrates a shadow formed in a third area in the tubular flipping effect.

A shadow of a curved surface portion is cast on a plane, as shown in FIG. 23, and $r_{shadow}$ may be found using the equation (2-10):

$$r_{shadow} = t_r + radius\left(\frac{1-\cos\theta}{\tan\varphi} - \sin\theta\right). \quad (2\text{-}10)$$

(4) With $\pi + \varnothing < \theta$

Figure 24:
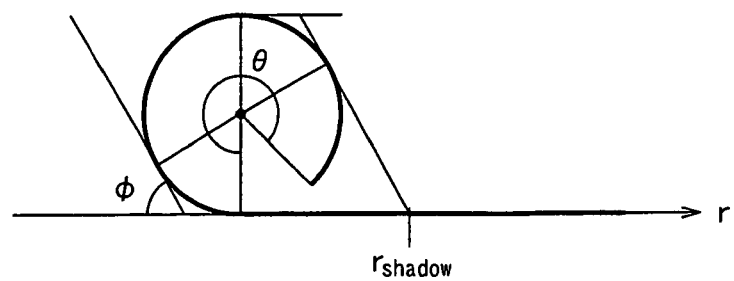
FIG. 24 illustrates a shadow formed in a fourth area in the tubular flipping effect.

A shadow of a planar surface is cast on a planar surface, with a constant shadow length, as shown in FIG. 24, and $r_{shadow}$ may be found using the equation (2-11):

$$r_{shadow} = t_r + \frac{radius}{\tan\frac{\varphi}{2}}. \quad (2\text{-}11)$$

Thus, if, in the tubular flipping effect, the position of the shadow is calculated, depending on the degree of flipping of the picture, it is possible to represent a more realistic flipping effect.

The structure and the operation of the hardware of the read address generator 3 in case of executing the tubular flipping effect are the same as those in case of executing the flipping effect as described above with reference to FIG. 15 and hence are not explained here specifically.

In this manner, the special picture effect device 1 uses the hardware, forming the read address generator 3, by a suitable combination, for converting the read address (x, y), entered to the read address generator 3, into the address (X, Y) usable for reading out a picture corresponding to the picture stored in the frame buffer 2 and which has been processed with the flipping effect.

3. Folding Effect

The folding effect is such a special effect in which a picture is folded with a preset folding width a preset number of times to cause the background picture to appear as it is read out from the frame buffer 4. It may be seen that the picture is folded in rectangular shape from the right side of the picture. In the folding effect, as in the flipping effect and in the tubular flipping effect, as described above, the picture to be folded (OverSide) and the background picture (UnderSide) need to be taken into account.

Referring to FIG. 26, the parameters used in the folding effect and supplied to the read address generator 3 are explained. A parameter IDivide is used for setting the number of times of the folding operations, with the default being 4. A parameter fixRotate indicates the amount of rotation of the coordinate axes, with the default being 0. A parameter fixMatteRatio is the transmittance indicating how much light is transmitted through the folding picture as it is displayed, with the default being 0. With the parameter fixMatteRatio equal to 0, the folded picture may be seen through completely. A parameter vMatteColor sets the color of the back surface of the folded picture.

A parameter trans is a parameter containing the time element which accords the quantity of movement of a picture to be rotated. If the parameter value is 0 or 1, the picture is not moved at all or disappears from the picture surface, respectively.

Specifically, the parameter trans is defined so that trans= (number of frames that took place as from the starting frame of the processing)/(total number of frames processed). For example, if it is desired to switch from the picture A to the picture B in e.g. a time of 30 frames, the values of trans=0/30, 1/30, 2/30, . . . , 29/30, 30/30 are received sequentially to carry out the processing on the frame basis.

If the sequential read address (x, y) is designated for the read address generator 3, the address (X, Y) of the picture address, read out from the frame buffer 2, is converted and found as now explained.

First, in finding the address (X, Y), associated with the read address (x, y), the read address (x, y) is converted into the address (x0, y0), using the equation (3-1):

$$x0 = x - cx$$

$$y0 = y - cy \quad (3\text{-}1):$$

for converting the coordinate system of the picture data stored in the frame buffer 2 to the coordinate system for calculations.

Then, the address is rotated by ø, using the equation (3-2):

$$x1 = x0 \cos\phi + y0 \sin\phi$$

$$y1 = -x0 \sin\phi + y0 \cos\phi \quad (3\text{-}2)$$

for coordinate transformation,

The address (x0, y0), rotated through ø, is converted to the address (x1, y1).

Then, using the equations (3-3) and (3-4):

$$X1 = f_1(x1)$$

$$Y1 = y1 \quad (3\text{-}3)$$

$$X1 = f_2(x1)$$

$$Y1 = y1 \quad (3\text{-}4)$$

the address when the picture has been folded is found. The equations (3-3) and (3-4) indicate the address of the OverSide picture and the UnderSide Picture, respectively.

The functions $f_1(x1)$, $f_2(x1)$ differ with the range of T as a fraction part of a product of the amount of movement trans and IDivide, while T is the range which defines the picture position for one folding event.

Figure 28:
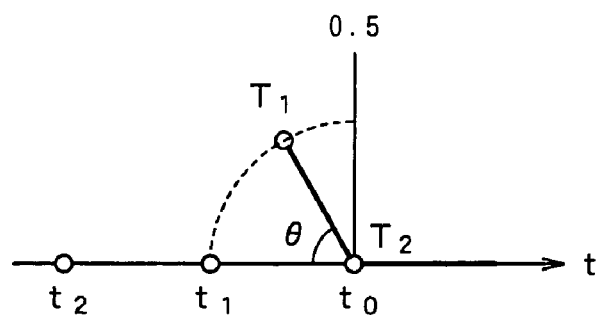
FIG. 28 shows a first range of the UnderSide in one folding.

FIGS. 27 and 28 show virtual cross-sectional views of the Over Slide picture and the Under Slide picture for $0 \leq T < 0.5$. It is shown that, with T=1.0 and T=0.5, the picture is folded once and to a one-half position, respectively. With $0 \leq T < 0.5$, the functions $f_1(x1)$, $f_2(x1)$ are as shown in the following equations (3-5) and (3-6), respectively:

1) $0 \leq T < 0.5$ $$f_1(x1) = \begin{cases} \text{Max} & (x1 < x' - W\cos\theta) \\ x' - 2W - \dfrac{x1 - x'}{\cos\theta} & (x' - W\cos\theta \leq x1 < x') \\ \text{Max} & (x' \leq x1) \end{cases} \quad (3\text{-}5)$$

$$f_2(x1) = \begin{cases} \text{Max} & (x1 < x' - W\cos\theta) \\ x' + \dfrac{x1 - x'}{\cos\theta} & (x' - W\cos\theta \leq x1 < x') \\ x1 & (x' \leq x1) \end{cases} \quad (3\text{-}6)$$

where $$W = \frac{\text{maximum picture width after rotation}}{\text{IDivide}}$$

x'=W×(number of times of folding−1)
θ=T×π
T=fraction part of trans×IDivide

Figure 29:
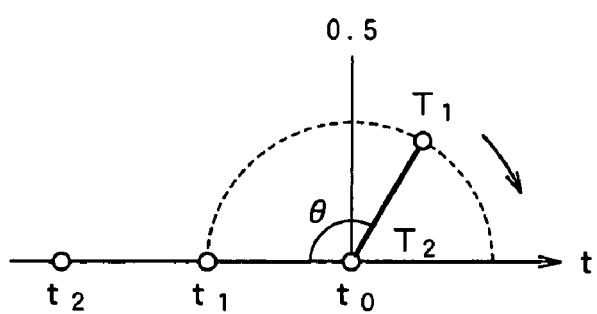
FIG. 29 shows a second range of the OverSide in one folding.
Figure 30:
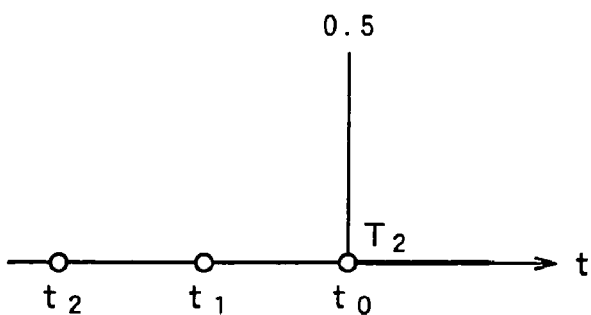
FIG. 30 shows a second range of the UnderSide in one folding.

In FIGS. 29 and 30, there are shown virtual cross-sectional views of the OverSide picture and the UnderSide picture for $0.5 \leq T < 1.0$. With $0.5 \leq T < 1.0$, the functions $f_1(x1)$ and $f_2(x1)$ are as shown in the equations (3-7) and (3-8), respectively.

2) $0.5 \leq T < 1.0$ $$f_1(x1) = \begin{cases} \text{Max} & (x1 < x') \\ x' + \dfrac{x1 - x'}{\cos\theta} & (x' \leq x1 < x' - W\cos\theta) \\ \text{Max} & (x' - W\cos\theta \leq x1) \end{cases} \quad (3\text{-}7)$$

$$f_2(x1) = \begin{cases} \text{Max} & (x1 < x') \\ x1 & (x' \leq x1) \end{cases} \quad (3\text{-}8)$$

where $$W = \frac{\text{maximum picture width after rotation}}{\text{IDivide}}$$

x'=W×(number of times of folding−1)
θ=T×π
T=fraction part of trans×IDivide

In the equations (3-5), (3-6), (3-7) and (3-8), Max indicates that it is designating an address other than the picture that may be designated by the address (X0, Y0). For example, if Max designates the address where there is stored as blue picture stored in the frame buffer 2, another picture may readily be synthesized to an area which has become the aforementioned Max, using the above picture as a key signal.

The address (X1, Y1) calculated is rotated by ø in the opposite direction to that of the equation (3-2), for coordinate transformation, to find the address (X0, Y0), using the equation (3-4):

$X0 = X1 \cos\phi - Y1 \sin\phi$ $Y0 = X1 \sin\phi - Y1 \cos\phi$ \hfill (3-9).

Moreover, since the center position of the address (X0, Y0) has been moved, the address (X, Y) is found, using the equation (3-10):

$X = X0 + cx$ $Y = Y0 + cy$ \hfill (3-10).

The hardware structure of the read address generator 3 in carrying out the flipping effect is now explained with reference to FIG. 31.

The read address generator 3 includes plural modules, such as an adder-multiplier and a polar coordinate to rectangular coordinate converter, and executes the above calculations, based on the combination of these modules.

Figure 31:
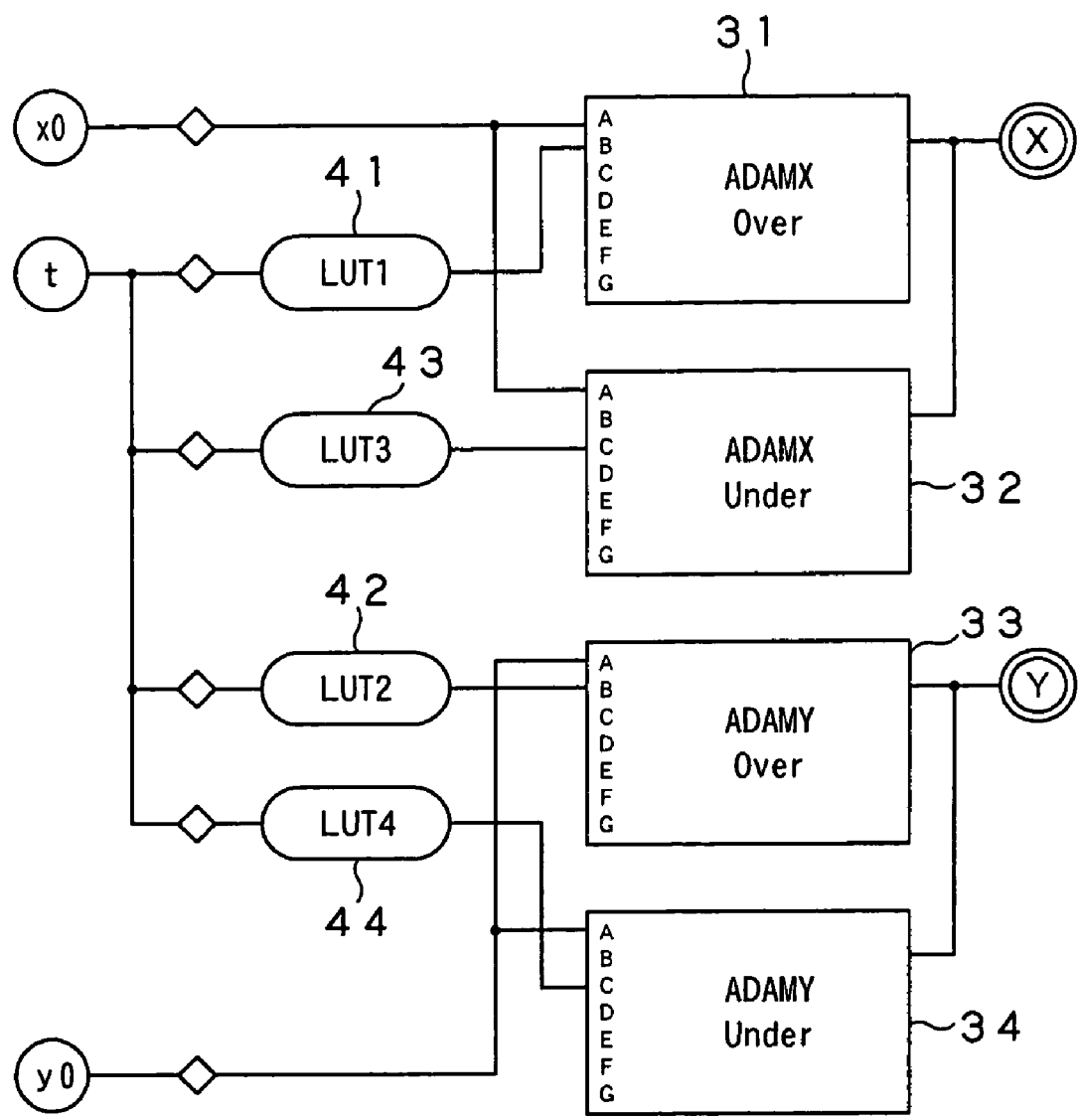
FIG. 31 illustrates a hardware structure of a read address generator for realizing the flipping effect.

In executing the flipping effect, LUTs (look-up tables) 41 to 44, an ADAMX (Over) 31, an ADAMX (Under) 32, an ADAMY (Over) 33 and an ADAMY (Under) 34 are used, as shown in FIG. 31.

The LUTs 41 to 44 are RAM (random access memory) tables, referred to by an address designated by cross-points indicated by diamond-shaped marks in the drawing. The data are set by a central processing unit (CPU), not shown.

In executing the folding effect, the equations (3-2), (3-3), (3-4) and (3-9) are modified, using a variable t, as defined by $t = (x0)\cos\phi + (y0)\sin\phi$, as indicated in the following, in order to reduce the volume of calculations.

The OverSide address (X0, Y0) is modified by a variable t to $X0 = x0 + (f_1(t) - t)\cos\phi$, $Y0 = y0 + (f_1(t) - t)\sin\phi$, while the UnderSide address (X0, Y0) is modified to $X0 = x0 + (f_2(t) - t)\cos\phi$, $Y0 = y0 + (f_2(t) - t)\sin\phi$.

Accordingly, $(f_1(t) - t)\cos\phi$, $(f_1(t) - t)\sin\phi$, $(f_2(t) - t)\cos\phi$ and $(f_2(t) - t)\sin\phi$ are set in the LUTs 41 to 44, respectively, by the CPU, not shown.

The ADAMX (Over) 31, ADAMX (Under) 32, ADAMY (Over) 33 and the ADAMY (Under) 34 are each provided with terminals A to G, and apply the calculations of (A+B)×(C+D)+E+F+G by addition and multiplication. For the terminals A to G, constant numbers or the cross-points indicated by diamond-shaped marks in the drawing may be designated.

The operation of conversion from the read address (x, y) to the address (X, Y) by the above-described read address generator 3 is now explained. It is noted that the calculations shown in the equation (3-1) are carried out on the read address (x, y) as pre-processing by the matrix calculations, and that the address (x0, y0) as converted is entered to the read address generator 3. For simplifying the equations (3-2), (3-3), (3-4) and (3-9), the variable defined by $t = (x0)\cos\phi + y0\sin\phi$ is also an input value, as noted above.

The ADAMX (Over) 31 sums x0 to an output of the LUT 41, to which the variable t has been entered, to calculate the OverSide address X0, and also sums cx to the so calculated address to execute the equation (3-10) in order to calculate the OverSide address X.

The ADAMX (Under) 32 sums x0 to an output of the LUT 43, to which the variable t has been entered, to calculate the UnderSide address X0, and also sums cx to the so calculated address to execute the equation (3-10) in order to calculate the UnderSide address X.

The ADAMX (Over) 33 sums y0 to an output of the LUT 42, to which the variable t has been entered, to calculate the OverSide address Y0, and also sums cy to the so calculated address to execute the equation (3-10) in order to calculate the OverSide address Y.

The ADAMX (Under) 34 sums x0 to an output of the LUT 44, to which the variable t has been entered, to calculate the UnderSide address Y0, and also sums cy to the so calculated address to execute the equation (3-10) in order to calculate the UnderSide address Y.

In this manner, the special picture effect device 1 uses the hardware, forming the read address generator 3, by a suitable combination, for converting the read address (x, y), entered to the read address generator 3, into the address (X, Y), usable for reading out a picture corresponding to the picture which is stored in the frame buffer 2 and which has been processed with the flipping effect.

As for an area where the address (X, Y) of the OverSide and the address of the UnderSide, as calculated, overlap with each other, the address (X, Y) of the OverSide is to be output.

What is claimed is:

1. A special effect device in which picture signals are read out from a frame buffer based on an address signal to impart a desired special effect to the picture signals read out from said frame buffer, said special effect device comprising:

address signal generating means for generating a readout address signal for said picture signals stored in said frame buffer so that, by flipping a picture, ruptured with an optional position of a picture, corresponding to said picture signals stored in said frame buffer, as a rupture point, for extending along a curve formed by an arc of a circle of a radius of an optional size, defined on a second virtual plane perpendicular to a first virtual plane to which belongs said picture, and by moving, after said picture corresponding to said rupture point has reached a height of the diameter of the circle on said second virtual plane, said picture corresponding to said rupture point along a plane parallel to said first virtual plane, such a special effect will be obtained in which the picture on said first virtual plane is peeled off sequentially radially along said arc about said optional position as center so as to disappear to outside a display area, wherein with said radius of the optional size of said circle as radius and the amount of movement of said picture as trans, said address signal generating means generates a readout address signal (R, Θ) from address signal (r, θ) of an overside of the picture on the polar coordinate system of said picture signals in an area in which the picture to be flipped and moved is output, by the equation (1-3):

$R = f_1(r)$ $\Theta = \theta$ (1-3)

which satisfies the equation (1-5):

$$f_1(r) = \begin{cases} \text{Max} & (0 \leq r < t_r - \text{radius}) \\ t_r - \text{radius} \times \left(\pi + \arcsin\left(\frac{t_r - r}{\text{radius}}\right)\right) & (t_r - \text{radius} \leq r < t_r) \\ 2 \times t_r - \text{radius} \times \pi - r & (t_r \leq r) \end{cases} \quad (1\text{-}5)$$

where $t_r$=trans×(radius+maximum value of the distance from the center to each apex point of the picture)

radius=fixRadius×picture height;

a readout address (R, Θ) on the polar coordinate system of said picture signals in an area for outputting an unflipped picture portion is generated by the equation (1-4):

$R = f_2(r)$ $\Theta = \theta$ (1-4)

which satisfies the equation (1-6):

$$f_2(r) = \begin{cases} \text{Max} & (0 \leq r < t_r - \text{radius}) \\ t_r - \text{radius} \times \arcsin\left(\frac{t_r - r}{\text{radius}}\right) & (t_r - \text{radius} \leq r < t_r) \\ r & (t_r \leq r) \end{cases} \quad (1\text{-}6)$$

where $t_r$=trans×(radius+maximum value of the distance from the center to each apex point of the picture)

radius=fixRadius×picture height;

the readout address signal (R, Θ) on the polar coordinate system is transformed by the equation (1-9):

X0=R cos Θ

Y0=R sin Θ (1-9)

readout signal generating means for generating the readout address signal (X0, Y0) on the rectangular coordinate system; and wherein a readout address signal (X, Y) in case said optional position on the rectangular coordinate system of said picture signals is (cx, cy) is generated by the equation (1-10):

$X = X0 + cx$ $Y = Y0 + cy$ (1-10)

provided that, in the equations (1-5) and (1-6), Max indicates the generation of the readout address signal for reading out a signal other than the picture signals stored in said frame buffer.

2. An address signal generating device for generating an address signal for reading out picture signals from a frame buffer, comprising:

address signal generating means for generating a readout address signal for said picture signals stored in said frame buffer so that, by flipping a picture, ruptured with an optional position of a picture, corresponding to said picture signals stored in said frame buffer, as a rupture point, for extending along a curve formed by an arc of a circle of a radius of an optional size, defined on a second virtual plane perpendicular to a first virtual plane to which belongs said picture, and by moving, after said picture corresponding to said rupture point has reached a height of the diameter of the circle on said second virtual plane, said picture corresponding to said rupture point along a plane parallel to said first virtual plane, such a special effect will be obtained in which the picture on said first virtual plane is peeled off sequentially radially along said arc, about said optional position as center, so as to disappear to outside a display area, wherein with said radius of the optional size of said circle as radius and the amount of movement of said picture as trans, said address signal generating means generates a readout address signal (R, Θ) from address signal (r, θ) of an overside of the picture on the polar coordinate system of said picture signals in an area in which the picture to be flipped and moved is output, by the equation (1-3):

$R = f_1(r)$ $\Theta = \theta$ (1-3)

which satisfies the equation (1-5):

$$f_1(r) = \begin{cases} \text{Max} & (0 \leq r < t_r - \text{radius}) \\ t_r - \text{radius} \times \left(\pi + \arcsin\left(\frac{t_r - r}{\text{radius}}\right)\right) & (t_r - \text{radius} \leq r < t_r) \\ 2 \times t_r - \text{radius} \times \pi - r & (t_r \leq r) \end{cases} \quad (1\text{-}5)$$

where
$t_r$=trans×(radius+maximum value of the distance from the center to each apex point of the picture)
radius=fixRadius×picture height;
a readout address (R, Θ) on the polar coordinate system of said picture signals in an area for outputting an unflipped picture portion is generated by the equation (1-4):

$R=f_2(r)$ $\Theta=\theta$ (1-4)

which satisfies the equation (1-6):

$$f_2(r) = \begin{cases} \text{Max} & (0 \leq r < t_r - \text{radius}) \\ t_r - \text{radius} \times \arcsin\left(\frac{t_r - r}{\text{radius}}\right) & (t_r - \text{radius} \leq r < t_r) \\ r & (t_r \leq r) \end{cases} \quad (1\text{-}6)$$

where
$t_r$=trans×(radius+maximum value of the distance from the center to each apex point of the picture)
radius=fixRadius×picture height;
the readout address signal (R, Θ) on the polar coordinate system is transformed by the equation (1-9):

X0=R cos Θ

Y0=R sin Θ (1-9)

readout signal generating means for generating the readout address signal (X0, Y0) on the rectangular coordinate system; and wherein
a readout address signal (X, Y) in case said optional position on the rectangular coordinate system of said picture signals is (cx, cy) is generated by the equation (1-10):

X=X0+cx

Y=Y0+cy (1-10)

provided that, in the equations (1-5) and (1-6), Max indicates the generation of the readout address signal for reading out a signal other than the picture signals stored in said frame buffer.

3. An address signal generating method for generating an address signal for reading out picture signals from a frame buffer, comprising:
an address signal generating step of generating a readout address signal for said picture signals stored in said frame buffer so that, by flipping a picture, ruptured with an optional position of a picture, corresponding to said picture signals stored in said frame buffer, as a rupture point, for extending along a curve formed by an arc of a circle of a radius of an optional size, defined on a second virtual plane perpendicular to a first virtual plane to which belongs said picture, and by moving, after said picture corresponding to said rupture point has reached a height of the diameter of the circle on said second virtual plane, said picture corresponding to said rupture point along a plane parallel to said first virtual plane, such a special effect will be obtained in which the picture on said first virtual plane is peeled off sequentially radially along said arc, about said optional position as center, so as to disappear to outside a display area,
wherein with said radius of the optional size of said circle as radius and the amount of movement of said picture as trans, said address signal generating step generates a readout address signal (R, Θ) from address signal (R, θ) of an overside of the picture on the polar coordinate system of said picture signals in an area in which the picture to be flipped and moved is output, by the equation (1-3):

$R=f_1(r)$ $\Theta=\theta$ (1-3)

which satisfies the equation (1-5):

$$f_1(r) = \begin{cases} \text{Max} & (0 \leq r < t_r - \text{radius}) \\ t_r - \text{radius} \times \left(\pi + \arcsin\left(\frac{t_r - r}{\text{radius}}\right)\right) & (t_r - \text{radius} \leq r < t_r) \\ 2 \times t_r - \text{radius} \times \pi - r & (t_r \leq r) \end{cases} \quad (1\text{-}5)$$

where
$t_r$=trans×(radius+maximum value of the distance from the center to each apex point of the picture)
radius=fixRadius×picture height;
a readout address (R, Θ) on the polar coordinate system of said picture signals in an area for outputting an unflipped picture portion is generated by the equation (1-4):

$R=f_2(r)$ $\Theta=\theta$ (1-4)

which satisfies the equation (1-6):

$$f_2(r) = \begin{cases} \text{Max} & (0 \leq r < t_r - \text{radius}) \\ t_r - \text{radius} \times \arcsin\left(\frac{t_r - r}{\text{radius}}\right) & (t_r - \text{radius} \leq r < t_r) \\ r & (t_r \leq r) \end{cases} \quad (1\text{-}6)$$

where
$t_r$=trans×(radius+maximum value of the distance from the center to each apex point of the picture)
radius=fixRadius×picture height;
the readout address signal (R, Θ) on the polar coordinate system is transformed by the equation (1-9):

X0=R cos Θ

Y0=R sin Θ (1-9)

to generate the readout address signal (X0, Y0) on the rectangular coordinate system; and wherein
a readout address signal (X, Y) in case said optional position on the rectangular coordinate system of said picture signals is (cx, cy) is generated by the equation (1-10):

X=X0+cx

Y=Y0+cy (1-10)

provided that, in the equations (1-5) and (1-6), Max indicates the generation of the readout address signal for reading out a signal other than the picture signals stored in said frame buffer.

4. A computer readable medium an address signal generating program storing for generating an address signal for reading out picture signals from a frame buffer, said program comprising:

an address signal generating step of generating a readout address signal for said picture signals stored in said frame buffer so that, by flipping a picture, ruptured with an optional position of a picture corresponding to said picture signals stored in said frame buffer as a rupture point, for extending along a curve formed by an arc of a circle of a radius of an optional size, defined on a second virtual plane perpendicular to a first virtual plane to which belongs said picture, and by moving, after said picture corresponding to said rupture point has reached a height of the diameter of the circle on said second virtual plane, said picture corresponding to said rupture point along a plane parallel to said first virtual plane, such a special effect will be obtained in which the picture on said first virtual plane is peeled off sequentially radially along said arc, about said optional position as center, so as to disappear to outside a display area, wherein with said radius of the optional size of said circle as radius and the amount of movement of said picture as trans, said address signal generating step generates a readout address signal $(R, \Theta)$ from address signal $(R, \theta)$ of an overside of the picture on the polar coordinate system of said picture signals in an area in which the picture to be flipped and moved is output, by the equation (1-3):

$$R = f_1(r)$$

$$\Theta = \theta \qquad (1\text{-}3)$$

which satisfies the equation (1-5):

$$f_1(r) = \begin{cases} \text{Max} & (0 \leq r < t_r - \text{radius}) \\ t_r - \text{radius} \times \left(\pi + \arcsin\left(\frac{t_r - r}{\text{radius}}\right)\right) & (t_r - \text{radius} \leq r < t_r) \\ 2 \times t_r - \text{radius} \times \pi - r & (t_r \leq r) \end{cases} \qquad (1\text{-}5)$$

where
$t_r$=trans×(radius maximum value of the distance from the center to each apex point of the picture)
radius=fixRadius×picture height;
a readout address $(R, \Theta)$ on the polar coordinate system of said picture signals in an area for outputting an unflipped picture portion is generated by the equation (1-4):

$$R = f_2(r)$$

$$\Theta = \theta \qquad (1\text{-}4)$$

which satisfies the equation (1-6):

$$f_2(r) = \begin{cases} \text{Max} & (0 \leq r < t_r - \text{radius}) \\ t_r - \text{radius} \times \arcsin\left(\frac{t_r - r}{\text{radius}}\right) & (t_r - \text{radius} \leq r < t_r) \\ r & (t_r \leq r) \end{cases} \qquad (1\text{-}6)$$

where
$t_r$=trans×(radius+maximum value of the distance from the center to each apex point of the picture)
radius=fixRadius+picture height;
the readout address signal $(R, \Theta)$ on the polar coordinate system is transformed by the equation (1-9):

$$X0 = R \cos \Theta$$

$$Y0 = R \sin \Theta \qquad (1\text{-}9)$$

to generate the readout address signal (X0, Y0) on the rectangular coordinate system; and wherein a readout address signal (X, Y) in case said optional position on the rectangular coordinate system of said picture signals is (cx, cy) is generated by the equation (1-10)

$$X = X0 + cx$$

$$Y = Y0 + cy \qquad (1\text{-}10)$$

provided that, in the equations (1-5) and (1-6), Max indicates the generation of the readout address signal for reading out a signal other than the picture signals stored in said frame buffer.

5. A special effect device in which picture signals are read out from a frame buffer based on an address signal to impart a desired special effect to the picture signals read out from said frame buffer, said special effect device comprising:

address signal generating means for generating a readout address signal for said picture signals stored in said frame buffer so that, by flipping a picture, ruptured with an optional position of a picture, corresponding to said picture signals stored in said frame buffer, as a rupture point, for extending along a curve formed by an arc of a circle of a radius of an optional size, defined on a second virtual plane perpendicular to a first virtual plane to which belongs said picture, and by moving, after said picture corresponding to said rupture point has reached a height of the diameter of the circle on said second virtual plane, said picture corresponding to said rupture point as if said picture corresponding to said rupture point is rolled along the other arc, such a special effect will be obtained in which the picture on said first virtual plane is peeled off sequentially radially along said arc, about said optional position as center, so as to disappear to outside a display area, wherein with said radius of the optional size of said circle as radius and the amount of movement of said picture as trans, said address signal generating means generates a readout address signal $(R, \Theta)$ from address signal $(R, \theta)$ of an overside of the picture on the polar coordinate system of said picture signals in an area in which the picture to be flipped and moved is output, by the equation (1-3):

$$R = f_1(r)$$

$$\Theta = \theta \qquad (1\text{-}3)$$

which satisfies the equation (1-5):

$$f_1(r) = \begin{cases} \text{Max} & (0 \leq r < t_r - \text{radius}) \\ t_r - \text{radius} \times \left(\pi + \arcsin\left(\frac{t_r - r}{\text{radius}}\right)\right) & (t_r - \text{radius} \leq r < t_r) \\ 2 \times t_r - \text{radius} \times \pi - r & (t_r \leq r) \end{cases} \qquad (1\text{-}5)$$

where $t_r$=trans×(radius+maximum value of the distance from the center to each apex point of the picture)

radius=fixRadius×picture height;

a readout address (R, Θ) on the polar coordinate system of said picture signals in an area for outputting an unflipped picture portion is generated by the equation (1-4):

$R=f_2(r)$

Θ=θ  (1-4)

which satisfies the equation (1-6):

$$f_2(r) = \begin{cases} \text{Max} & (0 \le r < t_r - \text{radius}) \\ t_r - \text{radius} \times \arcsin\left(\frac{t_r - r}{\text{radius}}\right) & (t_r - \text{radius} \le r < t_r) \\ r & (t_r \le r) \end{cases} \quad (1\text{-}6)$$

where $t_r$=trans×(radius+maximum value of the distance from the center to each apex point of the picture)

radius=fixRadius×picture height;

the readout address signal (R, Θ) on the polar coordinate system is transformed by the equation (1-9):

X0=R cos Θ

Y0=R sin Θ  (1-9)

readout signal generating means for generating the readout address signal (X0, Y0) on the rectangular coordinate system; and wherein a readout address signal (X, Y) in case said optional position on the rectangular coordinate system of said picture signals is (cx, cy) is generated by the equation (1-10):

X=X0+cx

Y=Y0+cy  (1-10)

provided that, in the equations (1-5) and (1-6), Max indicates the generation of the readout address signal for reading out a signal other than the picture signals stored in said frame buffer.

6. An address signal generating device for generating an address signal from a frame buffer, said special effect device comprising:

address signal generating means for generating readout address signals for said picture signals stored in said frame buffer so that, by flipping a picture, ruptured with an optional position of a picture, corresponding to said picture signals stored in said frame buffer as a rupture point, for extending along a curve formed by an arc of a circle of a radius of an optional size, defined on a second virtual plane perpendicular to a first virtual plane to which belongs said picture, and by moving, after said picture corresponding to said rupture point has reached a height of the diameter of the circle on said second virtual plane, said picture corresponding to said rupture point as if said picture corresponding to said rupture point is rolled along the other arc, such a special effect will be obtained in which the picture on said first virtual plane is peeled off sequentially radially along said arc, about said optional position as center, so as to disappear to outside a display area, wherein with said radius of the optional size of said circle as radius and the amount of movement of said picture as trans, said address signal generating means generates a readout address signal (R, Θ) from address signal (R, θ) of an overside of the picture on the polar coordinate system of said picture signals in an area in which the picture to be flipped and moved is output, by the equation (1-3):

$R=f_1(r)$

Θ=θ  (1-3)

which satisfies the equation (1-5):

$$f_1(r) = \begin{cases} \text{Max} & (0 \le r < t_r - \text{radius}) \\ t_r - \text{radius} \times \left(\pi + \arcsin\left(\frac{t_r - r}{\text{radius}}\right)\right) & (t_r - \text{radius} \le r < t_r) \\ 2 \times t_r - \text{radius} \times \pi - r & (t_r \le r) \end{cases} \quad (1\text{-}5)$$

where $t_r$=trans×(radius+maximum value of the distance from the center to each apex point of the picture)

radius=fixRadius×picture height;

a readout address (R, Θ) on the polar coordinate system of said picture signals in an area for outputting an unflipped picture portion is generated by the equation (1-4):

$R=f_2(r)$

Θ=θ  (1-4)

which satisfies the equation (1-6):

$$f_2(r) = \begin{cases} \text{Max} & (0 \le r < t_r - \text{radius}) \\ t_r - \text{radius} \times \arcsin\left(\frac{t_r - r}{\text{radius}}\right) & (t_r - \text{radius} \le r < t_r) \\ r & (t_r \le r) \end{cases} \quad (1\text{-}6)$$

where $t_r$=trans×(radius+maximum value of the distance from the center to each apex point of the picture)

radius=fixRadius×picture height;

the readout address signal (R, Θ) on the polar coordinate system is transformed by the equation (1-9):

X0=R cos Θ

Y0=R sin Θ  (1-9)

readout signal generating means for generating the readout address signal (X0, Y0) on the rectangular coordinate system; and wherein a readout address signal (X, Y) in case said optional position on the rectangular coordinate system of said picture signals is (cx, cy) is generated by the equation (1-10):

X=X0+cx

Y=Y0+cy  (1-10)

provided that, in the equations (1-5) and (1-6), Max indicates the generation of the readout address signal for reading out a signal other than the picture signals stored in said frame buffer.

7. An address signal generating method for generating an address signal from a frame buffer, said special effect method comprising:

an address signal generating step of generating readout address signals for said picture signals stored in said frame buffer so that, by flipping a picture, ruptured with an optional position of a picture, corresponding to said picture signals stored in said frame buffer, as a rupture point, for extending along a curve formed by an arc of a circle of a radius of an optional size, defined on a second virtual plane perpendicular to a first virtual plane to which belongs said picture, and by moving, after said picture corresponding to said rupture point has reached a height of the diameter of the circle on said second virtual plane, said picture corresponding to said rupture point as if said picture corresponding to said rupture point is rolled along the other arc, such a special effect will be obtained in which the picture on said first virtual plane is peeled off sequentially radially along said arc, about said optional position as center, so as to disappear to outside a display area, wherein with said radius of the optional size of said circle as radius and the amount of movement of said picture as trans, said address signal generating step generates a readout address signal $(R, \Theta)$ from address signal $(R, \theta)$ of an overside of the picture on the polar coordinate system of said picture signals in an area in which the picture to be flipped and moved is output, by the equation (1-3):

$$R=f_1(r)$$

$$\Theta=\theta \qquad (1\text{-}3)$$

which satisfies the equation (1-5):

$$f_1(r) = \begin{cases} \text{Max} & (0 \leq r < t_r - \text{radius}) \\ t_r - \text{radius} \times \left(\pi + \arcsin\left(\frac{t_r - r}{\text{radius}}\right)\right) & (t_r - \text{radius} \leq r < t_r) \\ 2 \times t_r - \text{radius} \times \pi - r & (t_r \leq r) \end{cases} \qquad (1\text{-}5)$$

where $t_r$=trans×(radius+maximum value of the distance from the center to each apex point of the picture)

radius fixRadius×picture height;

a readout address $(R, \Theta)$ on the polar coordinate system of said picture signals in an area for outputting an unflipped picture portion is generated by the equation (1-4):

$$R=f_2(r)$$

$$\Theta=\theta \qquad (1\text{-}4)$$

which satisfies the equation (1-6):

$$f_2(r) = \begin{cases} \text{Max} & (0 \leq r < t_r - \text{radius}) \\ t_r - \text{radius} \times \arcsin\left(\frac{t_r - r}{\text{radius}}\right) & (t_r - \text{radius} \leq r < t_r) \\ r & (t_r \leq r) \end{cases} \qquad (1\text{-}6)$$

where $t_r$=trans×(radius+maximum value of the distance from the center to each apex point of the picture)

radius=fixRadius×picture height;

the readout address signal $(R, \Theta)$ on the polar coordinate system is transformed by the equation (1-9):

$$X0=R \cos \Theta$$

$$Y0=R \sin \Theta \qquad (1\text{-}9)$$

to generate the readout address signal $(X0, Y0)$ on the rectangular coordinate system; and wherein a readout address signal $(X, Y)$ in case said optional position on the rectangular coordinate system of said picture signals is $(cx, cy)$ is generated by the equation (1-10):

$$X=X0+cx$$

$$Y=Y0+cy \qquad (1\text{-}10)$$

provided that, in the equations (1-5) and (1-6), Max indicates the generation of the readout address signal for reading out a signal other than the picture signals stored in said frame buffer.

8. A computer readable medium an address signal generating program storing for generating an address signal for reading out picture signals from a frame buffer, said program comprising:

an address signal generating step of generating readout address signals for said picture signals stored in said frame buffer so that, by flipping a picture, ruptured with an optional position of a picture, corresponding to said picture signals stored in said frame buffer, as a rupture point, for extending along a curve formed by an arc of a circle of a radius of an optional size, defined on a second virtual plane perpendicular to a first virtual plane to which belongs said picture, and by moving, after said picture corresponding to said rupture point has reached a height of the diameter of the circle on said second virtual plane, said picture corresponding to said rupture point as if said picture corresponding to said rupture point is rolled along the other arc, such a special effect will be obtained in which the picture on said first virtual plane is peeled off sequentially radially along said arc, about said optional position as center, so as to disappear to outside a display area, wherein with said radius of the optional size of said circle as radius and the amount of movement of said picture as trans, said address signal generating step generates a readout address signal $(R, \Theta)$ from address signal $(R, \theta)$ of an overside of the picture on the polar coordinate system of said picture signals in an area in which the picture to be flipped and moved is output, by the equation (1-3):

$$R=f_1(r)$$

$$\Theta=\theta \qquad (1\text{-}3)$$

which satisfies the equation (1-5):

$$f_1(r) = \begin{cases} \text{Max} & (0 \leq r < t_r - \text{radius}) \\ t_r - \text{radius} \times \left(\pi + \arcsin\left(\frac{t_r - r}{\text{radius}}\right)\right) & (t_r - \text{radius} \leq r < t_r) \\ 2 \times t_r - \text{radius} \times \pi - r & (t_r \leq r) \end{cases} \qquad (1\text{-}5)$$

where $t_r$=trans×(radius+maximum value of the distance from the center to each apex point of the picture)

radius=fixRadius×picture height;

a readout address (R, Θ) on the polar coordinate system of said picture signals in an area for outputting an unflipped picture portion is generated by the equation (1-4):

$$R = f_2(r)$$

$$\Theta = \theta \qquad (1\text{-}4)$$

which satisfies the equation (1-6):

$$f_2(r) = \begin{cases} \text{Max} & (0 \leq r < t_r - \text{radius}) \\ t_r - \text{radius} \times \arcsin\left(\frac{t_r - r}{\text{radius}}\right) & (t_r - \text{radius} \leq r < t_r) \\ r & (t_r \leq r) \end{cases} \qquad (1\text{-}6)$$

where
$t_r$=trans×(radius+maximum value of the distance from the center to each apex point of the picture)
radius=fixRadius×picture height;

the readout address signal (R, Θ) on the polar coordinate system is transformed by the equation (1-9):

$$X0 = R \cos \Theta$$

$$Y0 = R \sin \Theta \qquad (1\text{-}9)$$

to generate the readout address signal (X0, Y0) on the rectangular coordinate system; and wherein a readout address signal (X, Y) in case said optional position on the rectangular coordinate system of said picture signals is (cx, cy) is generated by the equation (1-10):

$$X = X0 + cx$$

$$Y = Y0 + cy \qquad (1\text{-}10)$$

provided that, in the equations (1-5) and (1-6), Max indicates the generation of the readout address signal for reading out a signal other than the picture signals stored in said frame buffer.

* * * * *